US012650356B2

(12) United States Patent
Rezaei et al.

(10) Patent No.: US 12,650,356 B2
(45) Date of Patent: Jun. 9, 2026

(54) SYSTEMS AND METHODS FOR GAS LEAK DETECTION USING UNMANNED AUTONOMOUS VEHICLES

(71) Applicant: Schlumberger Technology Corporation, Sugar Land, TX (US)

(72) Inventors: Ali Rezaei, Houston, TX (US); Nasser Ghorbani, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/953,334

(22) Filed: Nov. 20, 2024

(65) Prior Publication Data

US 2025/0164338 A1 May 22, 2025

Related U.S. Application Data

(60) Provisional application No. 63/600,764, filed on Nov. 20, 2023.

(51) Int. Cl.
| | |
|---|---|
| *G01M 3/04* | (2006.01) |
| *G05D 1/689* | (2024.01) |
| *G05D 105/80* | (2024.01) |

(52) U.S. Cl.
CPC .............. *G01M 3/04* (2013.01); *G05D 1/689* (2024.01); *G05D 2105/89* (2024.01)

(58) Field of Classification Search
None
See application file for complete search history.

(56) References Cited

U.S. PATENT DOCUMENTS

| | | | | |
|---|---|---|---|---|
| 2016/0266579 A1* | 9/2016 | Chen | .................... | G05D 1/0044 |
| 2018/0292286 A1* | 10/2018 | Dittberner | .............. | G06V 20/17 |
| 2021/0247369 A1 | 8/2021 | Nottrott | | |
| 2021/0325894 A1* | 10/2021 | Faust | .................... | G06N 3/082 |
| 2024/0339021 A1* | 10/2024 | Cooper | ............... | G08B 29/185 |

OTHER PUBLICATIONS

Alvarez, R. A. et al. "Assessment of methane emissions from US oil and gas supply chain", Science, 2018, 361, pp. 186-188.
Bagtzoglou, A. C. et al., "Near real-time atmospheric contamination source identification by an optimization-based inverse method", Inverse Problems in Science and Engineering, 2005, 13(3), pp. 241-259.

(Continued)

*Primary Examiner* — Navid Z. Mehdizadeh
*Assistant Examiner* — Jason R Roberson
(74) *Attorney, Agent, or Firm* — Kyle R. Miiller

(57) ABSTRACT

A method of operation of an unmanned autonomous vehicle includes autonomously maneuvering the unmanned autonomous vehicle about a facility, collecting gas concentration data using one or more sensors carried on or integrated with the unmanned autonomous vehicle, and monitoring the collected gas concentration data to detect a high concentration due to a gas leak. The method further includes, if a high concentration is detected, estimating a location of the gas leak and maneuvering the unmanned autonomous vehicle toward the estimated location of the gas leak.

20 Claims, 7 Drawing Sheets

(56) References Cited

OTHER PUBLICATIONS

Fox, T. A. et al., "A review of close-range and screening technologies for mitigating fugitive methane emissions in upstream oil and gas", Environmental Research Letters, 2019, 14(5), 18 pages.

Gemerek, J. R. et al., "Fugitive gas emission rate estimation using multiple heterogeneous mobile sensors", In: 2017 ISOCS/IEEE International Symposium on Olfaction and Electronic Nose (ISOEN), IEEE, pp. 1-3.

Golston, L. M. et al., "Natural gas fugitive leak detection using an unmanned aerial vehicle: Localization and quantification of emission rate", Atmosphere, 2018, 9(9), 333, 17 pages.

Klein, L. J. et al., "Wireless sensor networks for fugitive methane emissions monitoring in oil and gas industry", In: 2018 IEEE International Congress on Internet of Things (ICIOT), IEEE, pp. 41-48.

Lewis, T. et al., "A comprehensive review of plume source detection using unmanned vehicles for environmental sensing", Science of the Total Environment, 2020, 762, 14 pages.

Saide, P. E. et al., "Evaluating Methods to Estimate Methane Emissions from Oil and Gas Production Facilities Using LES Simulations", Environmental Science Technology, 2018 52(19), 10 pages.

Travis, B. et al., "Neural networks to locate and quantify fugitive natural gas leaks for a 466 mir detection system", Atmospheric Environment, 2020, X 8, 12 pages.

* cited by examiner

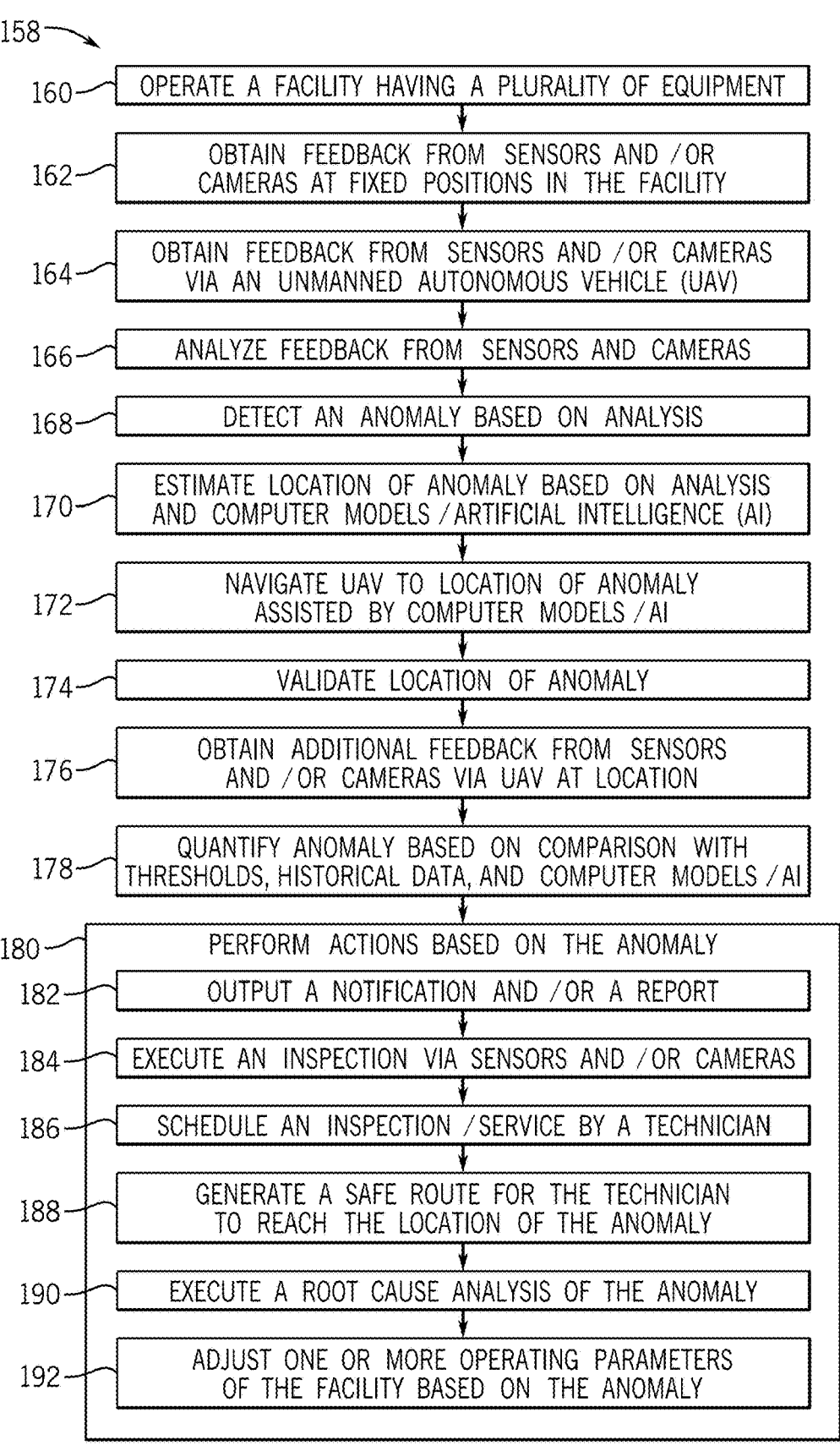

158

160 — OPERATE A FACILITY HAVING A PLURALITY OF EQUIPMENT

162 — OBTAIN FEEDBACK FROM SENSORS AND /OR CAMERAS AT FIXED POSITIONS IN THE FACILITY

164 — OBTAIN FEEDBACK FROM SENSORS AND /OR CAMERAS VIA AN UNMANNED AUTONOMOUS VEHICLE (UAV)

166 — ANALYZE FEEDBACK FROM SENSORS AND CAMERAS

168 — DETECT AN ANOMALY BASED ON ANALYSIS

170 — ESTIMATE LOCATION OF ANOMALY BASED ON ANALYSIS AND COMPUTER MODELS /ARTIFICIAL INTELLIGENCE (AI)

172 — NAVIGATE UAV TO LOCATION OF ANOMALY ASSISTED BY COMPUTER MODELS /AI

174 — VALIDATE LOCATION OF ANOMALY

176 — OBTAIN ADDITIONAL FEEDBACK FROM SENSORS AND /OR CAMERAS VIA UAV AT LOCATION

178 — QUANTIFY ANOMALY BASED ON COMPARISON WITH THRESHOLDS, HISTORICAL DATA, AND COMPUTER MODELS /AI

180 — PERFORM ACTIONS BASED ON THE ANOMALY

182 — OUTPUT A NOTIFICATION AND /OR A REPORT

184 — EXECUTE AN INSPECTION VIA SENSORS AND /OR CAMERAS

186 — SCHEDULE AN INSPECTION /SERVICE BY A TECHNICIAN

188 — GENERATE A SAFE ROUTE FOR THE TECHNICIAN TO REACH THE LOCATION OF THE ANOMALY

190 — EXECUTE A ROOT CAUSE ANALYSIS OF THE ANOMALY

192 — ADJUST ONE OR MORE OPERATING PARAMETERS OF THE FACILITY BASED ON THE ANOMALY

FIG. 3

SYSTEMS AND METHODS FOR GAS LEAK DETECTION USING UNMANNED AUTONOMOUS VEHICLES

CROSS-REFERENCE TO RELATED APPLICATION

The present application is a U.S. Non-Provisional Patent Application claiming benefit of U.S. Provisional Patent Application No. 63/600,764, entitled "GAS LEAK DETECTION USING UNMANNED AUTONOMOUS VEHICLES", filed Nov. 20, 2023, which is herein incorporated by reference.

BACKGROUND

The present disclosure relates generally to unmanned autonomous vehicles, and more particularly to unmanned autonomous vehicles to perform inspections.

Unmanned autonomous vehicles, such as unmanned ground vehicles (UGVs) or ground-based drones, unmanned aerial vehicles (UAVs) or aerial drones, unmanned underwater vehicles (UUVs) or underwater drones, unmanned surface vehicles (USV) or uncrewed boats, robots, and so forth, may be used for various purposes in various industries. For example, unmanned autonomous vehicles may be used to perform inspections of oil and gas production sites, processing facilities, refineries, manufacturing facilities, energy facilities, and so forth. Inspection by unmanned autonomous vehicles can be more consistent and less time-consuming and expensive than inspections performed by human operators, for example, using handheld devices. Use of unmanned autonomous vehicles may be particularly desirable in cases where exposure to fluid emissions (e.g., gases and/or liquids) may be detrimental to an operator's health and/or may violate one or more regulatory policies that aim to limit exposure of certain chemicals to employees of an enterprise.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In certain embodiments, a method of operation of an unmanned autonomous vehicle includes autonomously maneuvering the unmanned autonomous vehicle about a facility, collecting gas concentration data using one or more sensors carried on or integrated with the unmanned autonomous vehicle, and monitoring the collected gas concentration data to detect a high concentration due to a gas leak. The method further includes, if a high concentration is detected, estimating a location of the gas leak and maneuvering the unmanned autonomous vehicle toward the estimated location of the gas leak.

In certain embodiments, a tangible and non-transitory machine readable medium having instructions to cause a processing system to autonomously maneuver an unmanned autonomous vehicle about a facility, collect gas concentration data using one or more sensors carried on or integrated with the unmanned autonomous vehicle, and monitor the collected gas concentration data to detect a high concentration due to a gas leak. If a high concentration is detected, the processing system is configured to estimate a location of the gas leak and maneuver the unmanned autonomous vehicle toward the estimated location of the gas leak.

In certain embodiments, a system includes an unmanned autonomous vehicle having a motion system configured to autonomously maneuver the unmanned autonomous vehicle about a facility, one or more sensors configured to collect gas concentration data, and a control system configured to monitor the collected gas concentration data and detect a high concentration due to a gas leak. The control system is configured to estimate a location of the gas leak if a high concentration is detected, and maneuver the unmanned autonomous vehicle toward the estimated location of the gas leak.

DRAWINGS

These and other features, aspects, and advantages of the present disclosure will become better understood when the following detailed description is read with reference to the accompanying drawings in which like characters represent like parts throughout the drawings, wherein:

FIG. 3 is a flow chart of an embodiment of a process for monitoring a facility using both fixed sensors and UAV inspection, including navigating the UAV to an anomaly assisted by computer models/artificial intelligence (AI).

DETAILED DESCRIPTION

Figure 1:
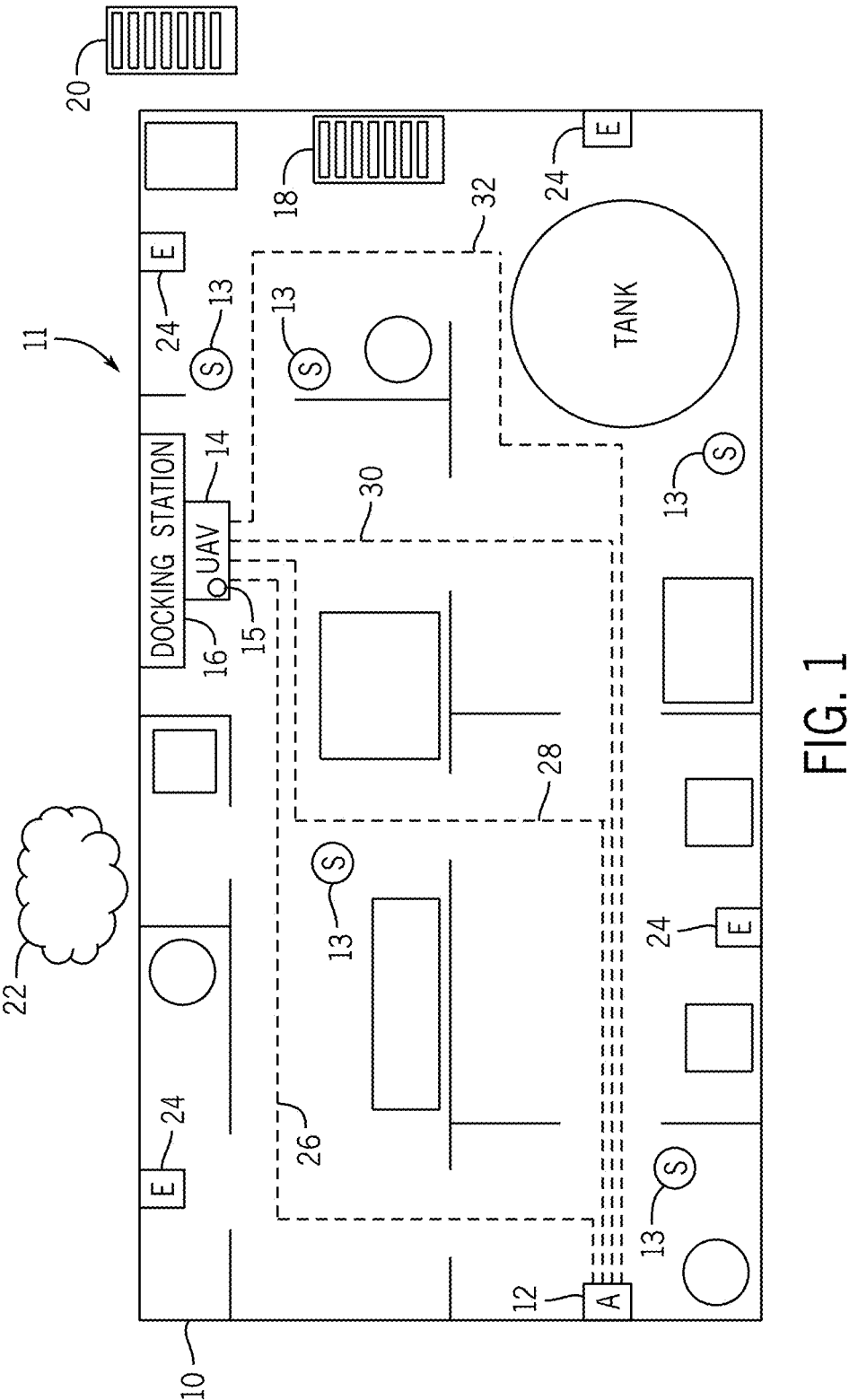
FIG. 1 is a schematic of a facility with unmanned autonomous vehicles (UAV), a docking station, and fixed sensors.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Inspections of oil and gas facilities for hazardous gas and liquid leaks are expensive, cumbersome, and prone to errors. These inspections are typically done regularly (e.g., monthly, quarterly, annually) by certified third-party contractors. However, if a leak occurs shortly after an inspection, by the time the subsequent scheduled inspection is due, the leak could have raised several HSE concerns and problems. These issues include human exposure to dangerous gases, such as hydrogen sulfide or methane (one of the main elements of global warming), that are unintentionally released into the atmosphere, also known as fugitive leaks.

Fugitive oil and gas industry emission monitoring and inspections may be carried out using Leak Detection And Repair (LDAR) programs. Available technologies for fugitive leak monitoring may be categorized into six groups: handheld devices, fixed sensors, Mobile ground labs (MGLs), uncrewed aerial vehicles (UAVs), aircraft, and satellites. The LDAR programs are specific to gas type. For example, Method 21 and optical gas imaging (OGI) methods have been approved and suggested by EPA for close-range leak detection and repair of methane. Hand-held OGI is a thermal imaging technology using high-sensitivity infrared cameras to detect fugitive gas emissions and has become the EPA's recommended method. The performance of this technology may depend on several parameters, such as emission rate, environmental conditions, and other factors like the system's design, adjustment, and use protocols. A problem with the handheld OGI technique is that it is a labor-intensive and expensive process. It also needs to be carried out and interpreted by an operator, subjecting the results to the operator's experience. The other EPA-approved technique is Method 21, which includes a probe and analyzer. The analyzer must remain in the suspected plume area throughout the inspection. Both of these techniques expose the inspectors to the potential leaked gas and have HSE issues.

Another method widely used for close-range LDAR is fixed gas sensors. Fixed gas sensors are devices that measure the concentration of a specific gas in one single location placed near the potential leak point(s), referred to as "point sensors." On top of the hardware technologies, two outstanding problems may be associated with a point sensor project: sensor placement planning and leak source quantification. To monitor gas leakage across a large area or an entire facility, simply installing the gas sensors without any plan to optimize the sensor deployment and interpretation may result in an expensive capital cost and no assurance that such deployment would bring encouraging returns.

Among the various available solutions, fixed point sensors are the cheapest solution and most commonly used for different gases. However, these sensors may have some drawbacks, mainly because the gas dispersion depends on parameters, such as wind speed and direction, that change instantaneously, making the near-ground atmospheric boundary layer turbulent. This complex turbulent fluid mechanics problem may result in improper leak identification by the fixed sensors when the gas molecules pass the sensor by only a few inches. Some mobile solutions, such as drone-mounted sensors and mobile ground labs (MGL), have been implemented to address this issue. However, these solutions are not permanent in the facility, the workflow is more or less manual (still relying on third-party contractors), and there is much room for detection proficiency (i.e., to improve the F-score).

The present disclosure provides a fully autonomous solution including a ground robot, a sensor unit, and an intelligent agent for hazardous gas leak detection, source localization, and rate estimation. The sensor unit may include one or more gas sensors and an anemometer. The intelligent agent may analyze collected data, estimate leak rate, and/or navigate the robot toward the location of a leak source. Systems and methods according to the present disclosure address three significant disadvantages of fixed sensors by mobilizing the sensors using a ground robot. By doing so, the chance of identifying a leak may be significantly higher than the fixed sensor, and the inspection interval may be considerably shorter (e.g., daily), greatly reducing the emission of a potential leak into the atmosphere. The robot (e.g., UAV) may advantageously be permanently installed in the facility and perform inspections at a given interval, upon command by an operator, and/or in response to sensor feedback from other sensors (e.g., fixed sensors and/or other UAV's) monitoring the facility. Systems and methods according to the present disclosure may utilize an intelligent cloud-based (and/or edge-based) agent that imports and analyzes information from multiple sensors (such as an anemometer and/or different gases), physics- and AI-based models, and a facility map to help the robot localize and navigate to the leak source if a leak is detected.

In various systems and methods according to the present disclosure, the robot (e.g., UAV) may automatically walk the facility's routes, which may be pre-created by the user. In some embodiments, the routes and times of the auto-walk executions may be arbitrary and changed by the operator. In other embodiments, the routes and times of the auto-walk executions may be based on previous leak detection experiences. Various combinations of one or more auto-walk routes and/or execution times may also be created to ensure the whole facility is covered. For example, two separate auto-walks, each covering half of the facility. In an example, one auto walk may be executed in the morning and the other in the afternoon.

The gas sensor(s) and anemometer may be attached to and/or integrated into the robot as external payloads. Multiple sensors may be used to inspect the facility for different gases. During the robot's auto walk, it may collect data such as gas concentration in ppm, wind speed, and wind direction. The data may be in the form of a time series and transferred to the intelligent cloud-based (or edge) engine in real-time for analysis. When the gas sensor detects a higher-than-usual gas concentration, the intelligent engine uses data-driven and physics-based models to direct or navigate the robot toward the source. The intelligent engine (commander) may take control of the robot until a satisfactory approximation of the leak source is achieved. The agent, which utilizes physics- and AI-based models, estimates and reports the leak source. The robot may still notify the operator if it can detect the leak but not localize the source.

Figure 6:
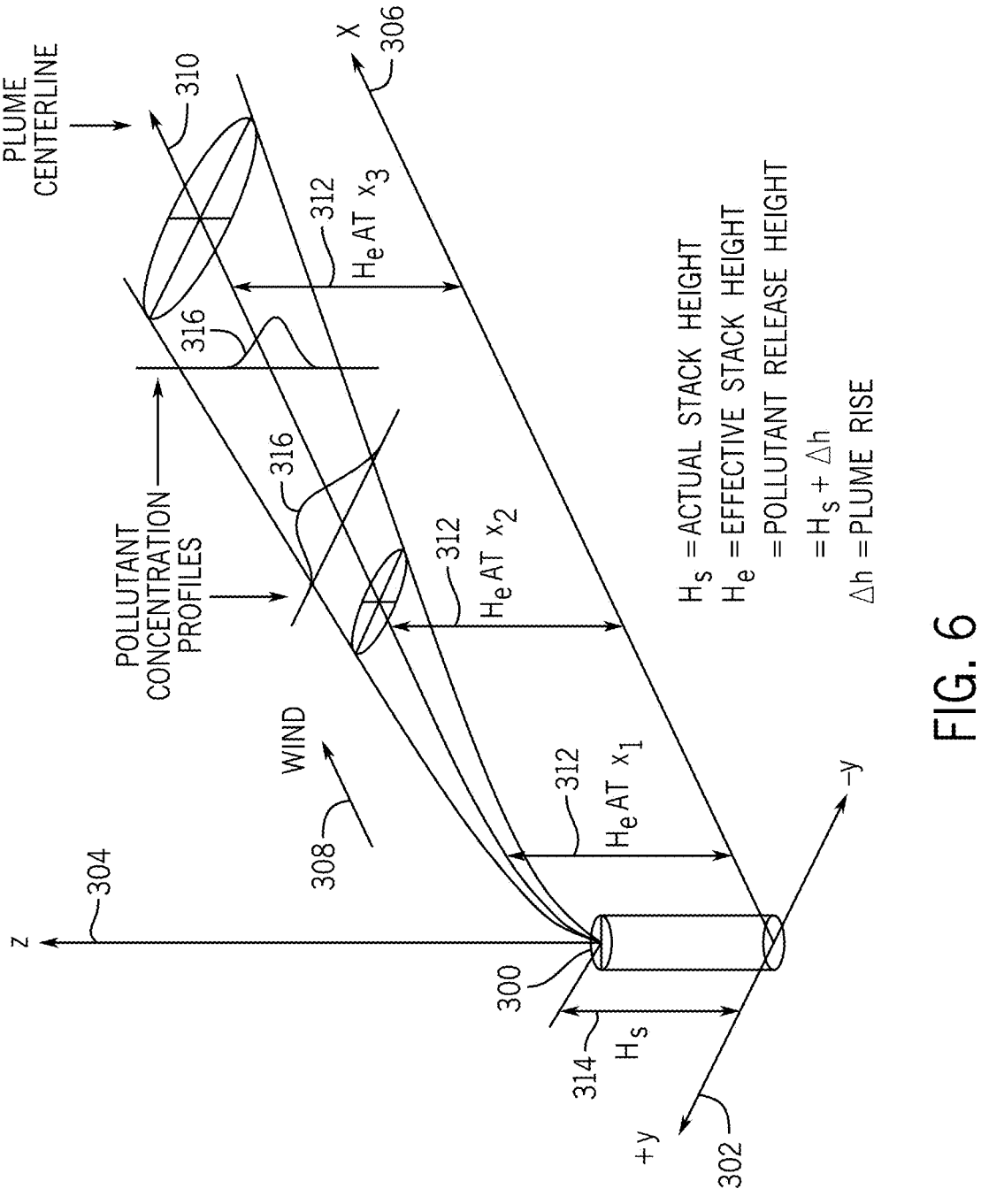
FIG. 6 is a schematic of a gaussian plume model.

A gas plume formed by a leak may have different shapes depending on wind speed, wind direction, solar radiations, temperature, leak rate, properties of the leaked gas, structures such as buildings at downwind, etc. Therefore, considerable simplifications may be made to model the plume shape mathematically. Most algorithms for placing fixed sensors (number and location) in facilities may be based on these simplified assumptions. As discussed below, FIG. 6 shows a widely-used funnel-type plume known as the Gaussian plume model. In this popular model, the plume may form concentric ellipses that get bigger as the distance from the source increases in the downwind direction. However, the actual plume shape is much more complex than the simplified Gaussian model. Various other models, such as AREMOD, are available to produce more complex simulated models. However, the plume shapes of such models are still approximations of the real plume, and instantaneous concentrations, especially in the facility premises, might differ from the model by several folds. The plume shape may vary depending on variable weather conditions. A similar spatial heterogeneity also exists on the facility-level scale that will be easy to miss even by a few inches by the fixed sensors. Also, source identification and leak quantification may still be challenging even if the sensors detect an unusually high gas concentration. Hence, a more reliable approach is needed for leak detection and source localization.

Systems and methods according to the present disclosure advantageously address shortcomings of the fixed sensors while offering their advantages. For example, systems and methods according to the present disclosure increase the probability of leak detection, increase the chance of finding the leak source, and/or increase or improve leak rate quantification estimation. By moving the sensor around using the robot, the probability of intersection the plume increases greatly compared to fixed sensors. When an unusually high gas concentration is detected in the facility, the intelligent agent (based on AI and physics-based models) directs the robot (in the direction of the higher concentration gradient) toward the source equipment, increasing the chance of localizing the leak source. With fixed sensors, multiple sensors have to sense the high concentration to triangulate the source. When the robot reaches a desirable proximity to the leak source (e.g., a few meters), the agent estimates the width of the intersection plane to the plume and directs the robot to take concentration measurements. These measurements can then be used to estimate the leak rate.

FIG. 1 is a schematic of a facility 10 having various sensors 11 to monitor assets 12, wherein the sensors 11 include fixed sensors 13 (e.g., stationary sensors) and sensors 15 (e.g., mobile sensors) disposed on one or more unmanned autonomous vehicle (UAV) 14. Additionally, as discussed in detail below, one or more computer models and/or artificial intelligence (AI) are used to improve the efficiency of monitoring the facility 10, including guiding navigation of the UAV 14 to any anomalies (e.g., leaks, sounds, lights, etc.) for further inspection of the assets 12.

The facility 10 may be an industrial facility, such as a manufacturing facility, an oil and gas drilling and/or extraction facility (e.g., on-shore or off-shore), an oil, gas, or produced water processing facility, a mine, a lab, a refinery, a waste processing center, a water treatment plant, a lumber mill, a machine shop, a wind turbine, etc. In other embodiments, the facility 10 may be a commercial facility, such as an office, a hospital or other medical facility, a restaurant, a retail store, a hotel, a gym, an events venue, a ship, etc. In further embodiments, the facility 10 may be residential facility, such as a house, an apartment building, etc. The facility 10 may also be a public facility such as a school, a government office building, a courthouse, a library, an airport, a train station, a bridge, a highway, etc. The facility 10 may be entirely indoors, entirely outdoors, or have a mix of indoor and outdoor spaces. Similarly, the facility 10 may be on land, in the air, on the water, under water, and so forth.

The facility 10 may include one or more assets 12. The assets 12 may include, for example, pieces of equipment, inventory, raw materials, doors, windows, human workers, robots, computing and/or networking equipment. For example, the equipment may include manufacturing and automation equipment, chemical processing and refinery equipment, fluid handling equipment, or any combination thereof. By further example, the equipment may include combustion engines, furnaces, boilers, reactors, pumps, compressors, mixers, valves, vessels, separators, thermal equipment (e.g., heating, ventilation, and air conditioning (HVAC) systems, heaters, coolers, etc.), radio frequency identification (RFID) tags, security systems, and so forth. Thus, a variety of the equipment may be fluid containing equipment that can discharge a plume (e.g., gas plume), either intentionally in a controlled manner or unintentionally as an unexpected leak. The disclosed embodiments help to monitor for various leaks and/or plumes using computer models and artificial intelligence (AI) associated with both the fixed sensors 13 and the sensors 15 carried by the UAV 14.

The assets 12 may be periodically inspected by one or more UAVs 14 having one or more sensors 15. Inspection and/or calibration may be performed on a set schedule (e.g., as defined by policies set forth by the entity that manages the facility, local, state, or federal law or regulation, standard setting organization guidelines, industry best practices, a machine learning-based algorithm, etc.), after a set number of cycles, on demand, in response to some triggering event, upon anomalous data being collected, etc. In some embodiments, if the asset 12 is or includes a measurement device, the inspection by the UAV 14 may include calibration of the measurement device. In some embodiments, the UAV 14 may adjust and/or control some aspect of the asset 12 based on sensor feedback acquired by the sensors 15 of the UAV 14 and/or the fixed sensors 13. For example, the sensors 11 (e.g. 13 and/or 15) may detect an unexpected leak and the UAV 14 may close a valve, shutdown a pump or compressor, or otherwise reduce or eliminate the leak by one or more control actions.

The sensors 11 (e.g., 13 and 15) may include gas sensors, temperature sensors, pressure sensors, humidity sensors, flow sensors, flow meters, flame sensors, liquid sensors, vibration sensors, accelerometers, motion sensors, audio sensors (e.g., microphones), light sensors, wind sensors (e.g., anemometers), cameras, and so forth. For example, in some embodiments, the sensors 11 may include one or more gas sensors configured to detect when certain gases, vapors, fluids, or particulates are present in the air at the facility 10. For example, the gas sensors may be configured to detect a combustible gas (e.g., natural gas, methane, hydrogen, syngas, etc.), an acid gas (e.g., hydrogen sulfide, carbon dioxide, etc.), carbon monoxide, and so forth, the presence of which may be indicative of a leak, a spill, a fire, insufficient venting, and so forth. In some embodiments, the sensors 11 may be permanently installed at the facility 10 as the fixed sensors 13 and/or the sensors 15 carried by the UAV 14. For example, the fixed sensors 13 may be installed at a plurality of fixed positions around the facility 10 for permanent use. This may be advantageous for use in standard operations for the facility 10. In other embodiments, the fixed sensors 13 may be temporary. For example, temporary fixed sensors 13 may be set up in areas of construction. In yet other embodiments, the fixed sensors 13 may be a combination of temporary and permanent. For example, there may be temporary fixed sensors 13 installed in addition to permanent fixed sensors 13 during plant turnarounds or during construction. The fixed sensors 13 may work in conjunction with the sensors 15 carried by the UAV 14 to assist with its inspections. Similar to the fixed sensors 13, the UAV 14 may be permanently installed at the facility 10 via a docking station 16 and/or temporarily deployed at the facility 10 with or without the docking station 16.

The UAV 14 may be land-based, air-based, or liquid-based (e.g., water-based, either surface-based or sub-surface-based). Accordingly, the UAV 14 may be a robot, a rover, an aerial drone, a remotely operated underwater vehicle (ROUV), a water surface drone, and the like. In certain embodiments, the UAV 14 may be a robot having 2, 3, 4 or more legs to walk around the facility 10, a ground vehicle having 2, 3, 4, or more wheels to drive around the facility 10, an aerial drone having one or more propellers, or a combination thereof. In some embodiments, the facility 10 may include a plurality of the UAVs 14 at the same or different locations around the facility 10, wherein the UAVs 14 may work together to provide monitoring of the facility 10.

As described in more detail below, the UAV 14 may dock at a docking station 16 when not in use. The docking station 16 may provide power to the UAV 14 (e.g., charging batteries), communicate with the UAV 14 (e.g., provide routes or other mapping data for download), and perform various other functions via the docking station 16.

As shown, the UAV 14 and/or the docking station 16 may be in communication with a local server 18 located at the facility 10, a remote server 20 disposed at a remote location relative to the facility 10, a cloud 22 (e.g., a public and/or private distributed computing architecture configured to provide storage and/or computing resources via one or more cloud-based computing devices), and/or one or more edge devices 24 (e.g., routers, switches, gateway devices, internet of things (IoT) devices, or other devices connected to a network that have computing capabilities) located at the facility 10. As discussed in more detail below, the UAV 14 may receive route data and/or traffic data from the local server 18, the remote server 20, the cloud 22, and/or the one or more edge devices 24, either directly or via the docking station 16. The route data may be based on satellite images, maps of the facility 10, data collected from fixed sensors 13 at the facility 10, and so forth. Further, in some embodiments, the UAV 14 may transmit requests for, and receive data regarding alternative routes, updated route information that takes one or more sensed items into consideration, and so forth. In certain embodiments, one or more computer models and/or AI may be stored and executed locally on the UAV 14, the local server 18, the remote server 20, the cloud 22, and/or the edge devices 24 to enable intelligent navigation of the UAV 14 to an anomaly, such as a gas leak in the facility 10.

Typically, when performing a routine or scheduled inspection, the UAV 14 receives a pre-programmed and approved route or series of waypoints that includes one or more inspection stops. The UAV 14 departs at a scheduled time, travels the route or follows the waypoints, performs the one or more inspections via the sensors 15, returns collected data, and returns to the docking station 16 or other route end location. In some cases, an asset 12 may generate an alert indicative of the asset 12 or an area around the asset 12 experiencing an anomaly (e.g., condition or problem), such as a fire, a chemical leak/spill, a gas leak, equipment failure, abnormal behavior, a health condition being below a threshold health level, etc. In such cases, an inspection of the asset 12 may be requested on short notice to assess the anomaly and determine a plan of action to address the condition or problem. In other embodiments, the inspection may be an unplanned inspection, an unscheduled inspection, an emergency inspection, a real-time generated inspection (or something along these lines), an alert/alarm triggered inspection, or control system triggered inspection (e.g., based on various sensors data and/or facility conditions indicating a potential real-time problem). However, in some cases a previously generated route from the UAV's 14 current location to the asset 12 to be inspected may not exist. Further, even if a route from the UAV's 14 current location to the asset to be inspected does exist, the route may be planned for a different time of day when traffic from other UAVs, vehicles, humans, wildlife, etc. may be different. Further, obstructions along the route, such as doors being open or closed, etc. may vary dependent upon the time of day.

Accordingly, in certain embodiments, one or more computer models and/or AI may generate a navigation route (e.g., route data) to the anomaly in real-time via intelligent navigation at the UAV 14, the docking station 16, the local server 18, the remote server 20, the cloud 22, and/or the one or more edge devices 24. For example, the one or more computer models and/or AI may generate the navigation route in real-time based on an evaluation of available sensor data from the fixed sensors 13 and the sensors 15 on the UAV 14, operating data (e.g., real-time data, historical data, service/maintenance data, etc.) of various assets 12 at the facility 10, various events (e.g., servicing of certain assets 12) at the facility 10, weather conditions, and any known blockages of areas in the facility 10. The route data may include, for example, multiple route options (e.g., route A 26, route B 28, route C 30, and route D 32), a suggested route of the available options, and/or available traffic data indicative of known routes being traveled by other UAVs at the time, or trends in traffic by humans, vehicles, wildlife, etc. at that time. In certain embodiments, the one or more computer models and/or AI may prompt a user to select a route (e.g., route A 26) from the available routes (e.g., route A 26, route B 28, route C 30, and route D 32), which may or may not be the suggested route, and depart along route A 26 toward the asset 12 upon selection by the user. In certain embodiments, the one or more computer models and/or AI may automatically select the route and proceed with navigation of the UAV 14 to the anomaly for further inspection. Again, the one or more computer models and/or AI may be partially or entirely executed on the UAV 14, the docking station 16, the local server 18, the remote server 20, the cloud 22, and/or the one or more edge devices 24, and thus any remote processing performed away from the UAV 14 may further include transmission of data (e.g., sensor data, route data, etc.) to and from the UAV 14 and the other computing devices (e.g., 16, 18, 20, 22, and/or 24).

As the UAV 14 travels along route A 26, the UAV 14 may utilize one or more onboard sensors 15 (e.g., proximity sensors, laser, sonar, camera, a red, blue, green, depth (RGB-D) camera, etc.) to identify unexpected obstructions along the route, such as other UAVs, humans, wildlife, vehicles, cleaning equipment, closed doors, fire, etc. If the UAV 14 encounters such an obstruction, the UAV 14 may stop in its place or identify a place to stop, and transmit a request for assistance to a nearby edge device 24, the docking station 16, the local server 18, the remote server 20, and/or the cloud 22. For example, if the UAV 14 requests help from a nearby edge device 24, the UAV 14 may transmit route data, which may be the same route data received before commencement of the mission, or a subset of the data received before commencement of the mission, to the edge device 24, along with data collected by the UAV 14 associated with the unexpected obstruction. This data may include, for example, video data, sonar data, and so forth. The edge device 24 may analyze the received data and suggest an alternative route (e.g., route B 28), or suggest that the UAV 14 continue along the planned route (e.g., route A 26). If the UAV 14 chooses to default to an alternative route (e.g., route B 28), the UAV 14 may determine how to get to the alternative route (e.g., route B 28) and then proceed along that path. For example, in the embodiment shown in FIG. 1, the UAV 14 may backtrack along route A 26 until it reaches route B 28 and then follow route B 28 to the asset 12. However, in some embodiments, the recognition of the obstruction and decision to default to an alternative route may be made entirely onboard the UAV 14 via the one or more computer models and/or AI. The UAV 14 may also use onboard sensors 15 to detect fire smoke, leaks, chemical spills, wildlife, authorized people, etc. The UAV 14 may use the one or more computer models and/or AI to evaluate any obstructions and/or issues affecting the navigation route, and automatically change the navigation route to reach the anomaly based on one or more factors (e.g., minimal time based on an urgency of the anomaly, minimal risk based on various hazards, minimal obstacles, etc.). In some embodiments, each obstruction and/or issue affecting the navigation route may prompt the one or more computer models and/or AI to present multiple route options to a user for a user to make a selection of the alternative route. In certain embodiments, the UAV 14 may use the one or more computer models and/or AI to automatically adjust the navigation route in real-time without any stops and/or with minimal stops, thereby reducing the time of arrival of the UAV 14 at the anomaly.

Once the UAV 14 arrives at the asset 12, the UAV performs the inspection of the anomaly via one or more sensors 15. In some embodiments, the UAV 14 may utilize onboard sensors 15 (e.g., tactile, chemical (e.g., gas/vapor sensors), ultrasound, temperature, laser, sonar, camera, an RGB-D camera, etc.) to inspect the anomaly at the asset 12. For example, the inspection may include a leak inspection and/or gas plume inspection via gas sensors, wind sensors, and/or cameras (e.g., RGB-D camera, thermal inspection camera, an optical gas imaging (OGI) camera, etc.). By further example, the inspection may include an analysis of a flow rate, a gas concentration, a leak location, or any combination thereof, of a gas leak and/or gas plume. In certain embodiments, the inspection may include an inspection of the leak location, including a size of the leak (e.g., cross-sectional area of a crack), an identity of a particular part having the leak (e.g., a flange, a valve body, a seal, a pump, a compressor, etc.), or any combination thereof. The inspection may include, for example, checking connections, tag numbers on cables and/or sensors, grounding, checking for abnormal readings (e.g., current, voltage, power, etc.), lack of power, lack of signal, signs of damage, etc. In some embodiments, the UAV 14 may be configured to communicatively couple to the asset 12 (e.g., via a wireless network connection, a wired network connection, cellular data service, Bluetooth, Near Field Communication (NFC), ZigBee, ANT+, LoRaWan, Z-wave, or some other communication protocol) and collect data from the asset 12. In some embodiments, collected data may be transmitted to the docking station 16, the local server 18, the remote server 20, the cloud 22, and/or the one or more edge devices 24 while the UAV 14 is in the presence of the asset 12. However, in other embodiments, the UAV 14 may wait to transmit collected data until the UAV 14 has returned to the docking station 16 or otherwise completed the mission and reached the end of its route. In some embodiments, the UAV 14 may flag the asset 12 for human attention (e.g., service, maintenance, etc.). In some embodiments, the UAV 14 may adjust and/or control one or more aspects of the asset 12 and/or related assets 12 in the facility 10 to reduce or eliminate the anomaly (e.g., gas leak), such as by closing a valve, shutting down a pump or compressor, diverting a fluid flow around the asset 12, or any combination thereof.

Once the inspection of the asset 12 is complete, the UAV 14 travels along a determined route back to the docking station 16, to the end of the planned route, or to another asset 12 for inspection. As previously discussed, as the UAV 14 travels the route, the UAV 14 may use onboard sensors 15 (e.g., proximity sensors, laser, sonar, camera, an RGB-D camera, etc.) to identify unexpected obstructions along the route, such as other UAVs, humans, wildlife, vehicles, cleaning equipment, closed doors, etc. In other embodiments satellite images, or images received from other devices may be used to identify obstructions. If such obstructions are encountered, the UAV 14 may request the assistance of a nearby edge device 24 (e.g., e.g., routers, switches, gateway devices, internet of things (IoT) devices, or other devices connected to a network that have computing capabilities), the docking station 16, the local server 18, the remote server 20, and/or the cloud 22, or the UAV 14 may identify an alternative route on its own and follow the alternative route to the next asset or to the end of the route and conclude its mission.

Figure 2:
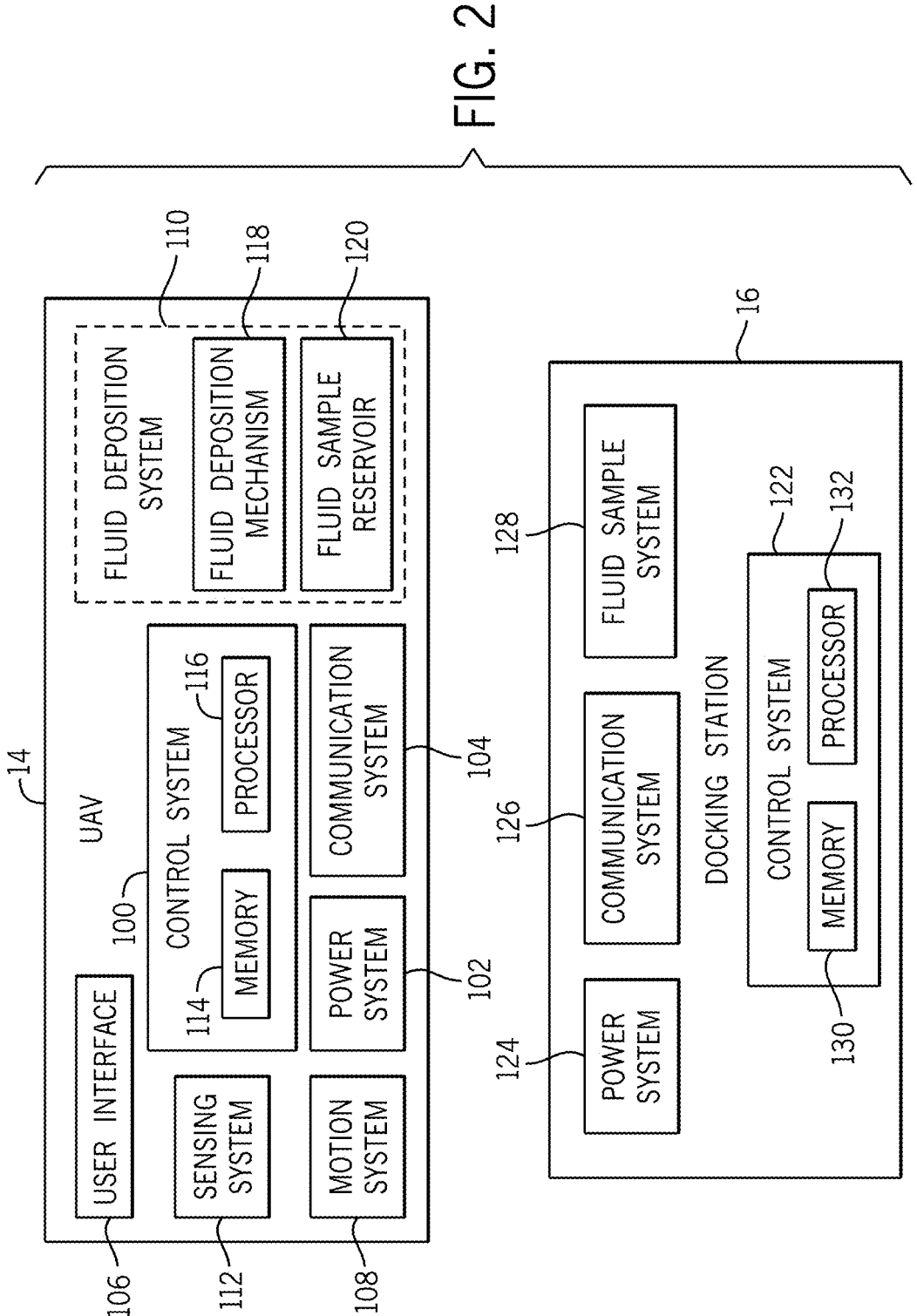
FIG. 2 is a schematic of the UAV and docking station of FIG. 1.

FIG. 2 is a schematic view of the UAV 14 and the docking station 16 of FIG. 1. As shown, the UAV 14 includes a control system 100, a power system 102, a communication system 104, a user interface 106, a motion system 108, a fluid deposition system 110, and a sensing system 112. The sensing system 112 includes one or more of the sensors 15 of FIG. 1. As noted above, the UAV 14 may use one or more computer models and/or AI to improve the efficiency of navigating and monitoring the facility 10, wherein the one or more computer models and/or AI may be disposed on the UAV 14 and/or other computing devices (e.g., 16, 18, 20, 22, and/or 24).

The control system 100 may include one or more memory components 114 and one or more processors 116 and be configured to control various aspects of the UAV 14, including the various systems shown in FIG. 2 (e.g., the power system 102, the communication system 104, the user interface 106, the motion system 108, the fluid deposition system 110, and/or the sensing system 112). In some embodiments, one or more of the systems of the UAV 14 shown in FIG. 2 may also include control components, including a memory 114 and a processor 116, to control some or all of the operations of the respective system. For example, the control system 100 may act in concert with the motion system 108 to receive a signal from the one or more sensors (e.g., encoders) of the motion system 108 and output a control signal to the one or more motors or movement actuators to control the movement of the UAV 14. Similarly, the control system 100 may coordinate with the sensing system 112 to receive data from the sensing system 112 (e.g., sensors 15) and process or analyze the collected data and determine what action to take next. In further embodiments, the UAV 14 may transmit data to the local server, the remote server, the cloud, and/or one of the edge devices via the communication system 104. In some embodiments, the control system 100 may also perform mission planning tasks, such as navigating to a location, deciding what action to take next, and then executing the next action by coordinating the various other components of the UAV 14 with assistance by the one or more computer models and/or AI.

In some embodiments, the control system 100 may perform navigation and mission planning tasks with assistance by the one or more computer models and/or AI. For example, the control system 100 may receive route data indicating one or more possible routes for a mission. In some embodiments, the route data may also include data representing traffic trends along the possible routes. The control system 100 may be configured to select a route and then control the motion system 108 to navigate the UAV 14 along the selected route. Further, the control system 100 may receive data from the sensing system 112 indicating various aspects of the environment around the UAV 14 and control the motion system 108 to navigate the UAV 14 around one or more obstacles or obstructions detected. Further, the control system 100 may, on its own or with the assistance of another device, identify that a route is obstructed or otherwise impassable, identify and select an alternative route, and use the motion system 108 to navigate the UAV along the route.

The power system 102 may be configured to provide power for various operations of the UAV 14. Accordingly, the power system 102 may include a replaceable or rechargeable battery, a combustion engine, a generator, an electric motor, a solar panel, a chemical-reaction-based power generation system, etc., or some combination thereof. In some embodiments, the power system 102 may be configured to draw power from the docking station 16 in the form of recharging batteries, taking on fuel or other fluids, and so forth.

The communication system 104 may be configured to communicate with devices disposed within the facility (e.g., the docking station 16, the local server, one or more edge devices, one or more assets, a remote controller, a smart phone, a computing device, a tablet, etc.), as well as devices that may be outside of the facility, such as the remote server, the cloud. For example, the communication system 104 may enable communication via a wireless network connection, a wired network connection, cellular data service, Bluetooth, NFC, ZigBee, ANT+, LoRaWan, Z-wave, or some other communication protocol. In some embodiments, the communication system 104 may be configured to encrypt some or all of the data it sends out and decrypt some or all of the data it receives.

The user interface 106 may be configured to receive input from a user configuring or adjusting various settings of the UAV 14. The user interface 106 may include one or more input devices (e.g., knobs, buttons, switches, dials, etc.) and in some cases may include an electronic display (e.g., a screen, array of LEDs, etc.) for providing feedback to the operator. In other embodiments, the UAV 14 may be configured by a separate off-board device (e.g., a remote control, a mobile device, a tablet, etc.) that acts as a user interface 106.

The motion system 108 actuates movement of the UAV 14 on the ground, through the air, through a liquid (e.g., water), along a surface of liquid, or some combination thereof. The motion system 108 may include one or more motors and, in some embodiments, one or more encoders. The motors may drive propellers, legs, wheels, tracks, wings, fins, etc. The encoders may sense one or more parameters of the motors (e.g., rotational speed) and provide data to a control system 100 or a controller within the motion system 108 to generate a control signal to control operation of the motors.

The fluid deposition system 110 may be configured to store fluid samples and emit the fluid samples during sensor inspection. As shown in FIG. 2, the fluid deposition system 110 may include a fluid deposition mechanism 118 and a fluid reservoir 120. The fluid reservoir 120 may be configured to store one or more samples of fluid to be emitted during sensor inspection. The fluid samples may be received via the docking station 16, a fluid sample refill station, or may be manually provided periodically by an operator.

The sensing system 112 may include one or more sensors 15 (e.g., tactile, chemical (e.g., gas/vapor sensors), ultrasound, temperature, laser, sonar, camera, an RGB-D camera, etc.) configured to sense various qualities and collect data corresponding to the area around the UAV 14. The sensors may be used during inspection of assets, for navigation of the UAV 14 through the facility, and so forth.

The UAV 14 may be configured to return to and connect to the docking station 16 when the UAV 14 is not in use. The docking station 16 may include a control system 122, a power system 124, a communication system 126, and a fluid sample system 128. The control system 122 may be configured to control operations of the docking station 16, including the various systems shown in FIG. 2 (e.g., the power system 124, the communication system 126, and the fluid sample system 128) and perform various tasks associated with the UAV 14. The control system 122 may include a memory component 130 and one or more processors 132. In some embodiments, the control system 122 may be configured to receive instructions and/or plans for the UAV 14 via the communication system 126, store the instructions and/or plans in the memory 130 and provide them to the UAV 14 for implementation. Correspondingly, the control system 122 may also receive data from the UAV 14 and pass data to a local or remote computing device (e.g., the local server, the remote server, the cloud, and/or the one or more edge devices) via the communication system 126.

The power system 124 may contain an internal source of power, such as a generator or battery, and/or be connected to external power, such as a utility grid (e.g., by being plugged into a power outlet), a generator, a battery, etc. Accordingly, the power system 124 may be configured to draw power from the internal or external source of power, in some cases store that power, use the power to run the docking station 16, and also provide power to the UAV 14 (e.g., via the UAV 14 power system 102). Accordingly, the power system 124 may charge the UAV's 14 batteries, provide fuel to the UAV 14, and so forth.

The communication system 126 may include communication circuitry configured to establish a wired or wireless connection with the communication system 104 of the UAV 14. For example, the connection may be a wireless network connection, a wired network connection, a cellular data connection, a Bluetooth connection, an NFC connection, a ZigBee connection, an ANT+ connection, a LoRaWan connection, a Z-wave connection, or a connection via some other communication protocol. The communication system 126 may be configured to receive data from the communication system 104 of the UAV 14 while the UAV is docked and/or when the UAV 14 is deployed out in the facility performing inspections or other tasks. The exchanged data may be related to an inspection of assets, mission planning, navigation, power supply, fluid sample supply, threat detection, obstruction detection, and so forth. Further, in some embodiments, the communication system 126 may be configured to communicate with a local or remote computing device via a wireless network connection, a wired network connection, a cellular data connection, a Bluetooth connection, an NFC connection, a ZigBee connection, an ANT+ connection, a LoRaWan connection, a Z-wave connection, or a connection via some other communication protocol. The local or remote computing device may be a desktop computer, a laptop computer, a mobile device, a tablet, a remote controller, a server, an edge device, a cloud-based computing device, etc. In such embodiments, the communication system 126 may be configured to provide and/or receive data regarding the operation of the UAV 14 to the local or remote computing device. For example, the local or remote computing device may be used by an operator to control the UAV 14, either directly, or via the docking station 16.

The fluid sample system 128 may maintain one or more reservoirs of fluid samples and provide fluid samples to the UAV 14 to emit during sensor inspection. In some embodiments, the fluid sample system 128 may store large quantities of the fluid sample materials and use a pump or some other actuator to provide fluid samples to the UAV 14. In such embodiments, the fluid samples may be stored in a reservoir and pumped into the fluid sample reservoir 120 of the UAV 14. However, in other embodiments, the fluid samples may be pre-packaged and the fluid sample system 128 may include an actuator that provides the pre-packaged fluid samples to the fluid deposition system 110 of the UAV 14. In such embodiments, the fluid sample system 128 may also be configured to retrieve used fluid sample packaging from the UAV 14 after the fluid samples have been emitted. The fluid samples may include a plurality of fluid samples disposed in respective sample containers, wherein the fluid samples may correspond to each of the gases being sensed by the various sensors 11.

It should be understood that the embodiments of the UAV 14 and docking station 16 shown and described with regard to FIG. 2 are merely examples and are not intended to limit the scope of the present application. As such, embodiments having different combinations of components are also envisaged.

FIG. 3 is a flowchart of an embodiment of a process 158 for monitoring a facility 10 using both fixed sensors 13 and UAV inspection via sensors 15 of the UAV 14. As noted above, the sensors 11 (e.g., 13 and 15) may include gas sensors, temperature sensors, pressure sensors, humidity sensors, flow sensors, flow meters, flame sensors, liquid sensors, vibration sensors, accelerometers, motion sensors, audio sensors (e.g., microphones), light sensors, wind sensors (e.g., anemometers), cameras, and so forth. Additionally, the UAV 14 may use one or more computer models and/or AI to improve the efficiency of navigating and monitoring the facility 10, wherein the one or more computer models and/or AI may be disposed on the UAV 14 and/or other computing devices (e.g., 16, 18, 20, 22, and/or 24). At block 160, the process 158 operates the facility 10 having a plurality of equipment (e.g., assets 12). The equipment may include flares, distillation columns, separators, valves, pumps, pipes, reactors, or any other machinery or fitting required for plant operation.

Next, at block 162, the process 158 may obtain feedback from fixed sensors 13 (e.g., sensors and/or cameras) at fixed positions in the facility 10. These fixed sensors 13 may be strategically placed to ensure wide coverage of the facility 10. For example, it may be advantageous to have a fixed sensor every 100 meters within a threshold distance from operating equipment. In certain embodiments, the fixed sensors 13 are disposed adjacent to each equipment or group of equipment, wherein the equipment may be a relatively higher importance and/or higher risk. For example, the fixed sensors 13 may be disposed adjacent equipment susceptible to gas leaks and/or having expected gas plumes, flares, etc. For example, placing a thermal sensor near a reactor containing a very thermal reaction may be advantageous for detecting a leak from the reactor. As another example, placing a fixed gas sensor 13 near a piece of equipment handling hazardous gases may be advantageous to quickly alert the user and the UAV 14 that there is a hazardous leak.

Next, at block 164, the process 158 may obtain feedback from onboard sensors 15 (e.g., sensors and/or cameras) via the UAV 14. In some embodiments, the sensors 15 onboard the UAV 14 may collect feedback similar to that of the fixed sensors 13. The sensors 15 on the UAV 14 may obtain feedback in a docked position at the docking station 16 or an undocked position while the UAV 14 is navigating throughout the facility 10. This may provide a wider range of leak coverage for the operation by allowing there to be more of the same sensors operating to detect leaks.

In certain embodiments, the UAV 14 may have different sensors 15 onboard than the fixed sensors 13. For example, the fixed sensors 13 may be sensors related to the weather (e.g., wind speed, wind direction, temperature, air pressure, humidity, etc.) and the onboard sensors 15 may be related to gas detection. This may be advantageous by providing a way for the fixed sensors to detect factors that may be substantially similar across the operation, while the UAV 14 detects factors that may vary, such as gas concentration, since the UAV 14 is not fixed. However, the sensors 11 (e.g., 13 and 15) may have any of the sensors and/or cameras described herein, wherein the fixed sensors 13 and sensors 15 may be the same or different from one another.

Further, in certain embodiments, it may be advantageous for the fixed sensors 13 to contain both weather sensors and gas detection sensors while the UAV 14 contains only gas detection sensors. This may be advantageous by providing a way for the fixed sensors to detect factors that may be substantially similar across the operation, while the UAV 14 detects factors that may vary, such as gas concentration, since the UAV 14 is not fixed. It also provides for consistent gas detection monitoring from the fixed sensors 13 while limiting potentially duplicative and heavy sensors from the UAV 14.

At block 166, the process 158 may analyze feedback from the sensors 11 (e.g., 13 and 15), which may include various sensors and/or cameras as described herein. In some embodiments, the process 158 may analyze feedback from only the fixed sensors 13, only the sensors 15, or a combination of the fixed sensors 13 and the sensors 15 on the UAV 14. For example, if the UAV 14 is not active, there may be no feedback from the UAV 14 to analyze. Analyzing only current feedback may limit the required processing power of the system and ensure more efficient computer operation.

The feedback analysis may include analyzing images (e.g., RGB images, thermal images, OGI images) from cameras of the sensors 11 (e.g., 13 and/or 15) to identify and analyze a gas leak and/or gas plume. The feedback analysis may include comparing the images to one or more baseline images, computer generated images (e.g., simulated images), or historical images (e.g., same area at a plurality of times in the past), or any combination thereof, to obtain a comparison. The comparison may be used to identify trends or changes in the image to identify aspects of the gas leak and/or gas plume, such as a flow direction, a flow rate, a gas volume, etc.

The feedback analysis also may include comparing a gas concentration level from gas sensors to one or more baseline gas concentration levels, computer generated (e.g., simulated) gas concentration levels based on operating conditions of the facility 10, or historical gas concentration levels (e.g., same area at a plurality of times in the past), or any combination thereof, to obtain a comparison. The comparison may be used to identify trends or changes in the gas concentration levels to identify aspects of the gas leak and/or gas plume, such as a flow direction, a flow rate, a gas volume, etc. For example, based on the feedback analyses and comparisons, the process 158 may detect an unexpected increase in the flow rates, gas volume, etc.

By further example, based on the feedback analyses and comparisons, the process 158 may detect an unexpected location for a gas leak and/or gas plume. In certain embodiments, one or more computer models and/or AI may track known locations of gas plumes throughout the facility 10, such as via a 3D model of the facility 10. The 3D model also may specify expected gas leaks and/or gas plumes in each known location. Thus, if any gas leaks and/or gas plumes are detected in unknown locations, such detections may be flagged as high priority. Likewise, for known locations, if any gas leaks and/or gas plumes exceed the expected quantities (e.g., flow rates, volumes, concentration levels, etc.), then such detections may be flagged as medium or high priority.

In certain embodiments, the process 158 may analyze feedback from only the onboard sensors 15 on the UAV 14. For example, if the feedback from the fixed sensors 13 is not above a threshold level, it may be more efficient to analyze only the feedback from the UAV 14 unless an anomaly is detected. Analyzing only current feedback from the UAV 14 may limit the required processing power of the system and ensure more efficient computer operation.

In certain embodiments, the process 158 may analyze feedback from both the fixed sensors 13 and the sensors 15 on the UAV 14. This may be advantageous to get a broad scope of understanding of the state of the operation of the facility 10, such that an anomaly may be initially detected by at least one of the sensors 11 (e.g., 13 and/or 15) in the facility 10. Specifically, utilizing all feedback in the analysis may provide a more comprehensive understanding than analyzing feedback of only the fixed sensors 13 or only the onboard sensors 15. For example, analyzing feedback from fixed sensors 13 or from onboard sensors 15 may determine that everything is below a threshold level and does not amount to an anomaly. However, analyzing feedback from all sensors 11 (e.g., 13 and 15) may indicate that there are one or more inputs approaching threshold levels in a way indicative of an anomaly. Therefore, utilizing all sensors 11 (e.g., 13 and 15) in analyzing the feedback may provide earlier anomaly detection. Additionally, analyzing the feedback from all sensors 11 (e.g., 13 and 15) may provide additional details regarding variations in the sensor feedback based on a position (e.g., 3D coordinates) in the facility 10. For example, gas concentration feedback may show variations in concentration levels at various locations throughout the facility 10, and the variations in concentration levels according to different positions of the sensors 11 (e.g., 13 and 15) may be helpful in mapping the gas concentration levels in the facility 10 relative to various equipment, known locations of gas leaks and/or gas plumes, and known locations of equipment that is susceptible to leakage.

At block 168, once the analysis is complete, the process 158 may detect an anomaly based on the analysis. An anomaly may be any abnormality in the feedback from the sensors 11 (e.g., 13 and/or 15). Specifically, the anomaly may be any measured feedback outside a threshold range. For example, a gas detected at a concentration above a threshold may be an anomaly. In some embodiments, the threshold may be determined by safety standards. For example, concentrations of a gas above a certain threshold may be toxic, so the threshold marking an anomaly may be determined based on the safety expectations. This may be advantageous by maintaining a constant threshold for hazardous anomalies. In certain embodiments, the threshold marking an anomaly may be determined based on historical data. For example, if an operation commonly has a certain concentration of a gas in the air, then the threshold may be some level over that concentration, because any level below that concentration may not be indicative of a leak.

In certain embodiments, the anomaly may include a gas concentration above one or more thresholds, a flow rate of a gas leak and/or gas plume above one or more thresholds, a volume of a gas leak and/or gas plume above one or more thresholds, a location of a gas leak and/or gas plume at a location different from known locations (e.g., based on a 3D model or map of known locations of gas leaks and/or gas plumes in the facility 10), or any combination thereof. The anomaly also may include a noise or acoustic sound, a light, a flame, a temperature, or any combination thereof, that is not expected and/or is abnormal for the location being monitored by one or more of the sensors 11 (e.g., 13 and/or 15). For example, a particular noise may be indicative of a break in equipment, an explosion, a gas leak, or component failure. The location of the sensors 11 (e.g., 13 and 15) may be used along with the sensor feedback to determine whether the sensor feedback is indicative of an anomaly. Additionally, the process 158 may obtain the feedback (e.g., blocks 162 and 164), analyze the feedback (block 166), and detect the anomaly (e.g., block 168) substantially in real-time concurrent with and/or separate from an inspection mission implemented by the UAV 14.

The anomaly may be detected using one or more of the sensors 11 (e.g., 13 and/or 15). In some embodiments, one or more of the fixed sensors 13 may detect sensor feedback indicative of an anomaly due to the proximity of the fixed sensors 13 to the anomaly (e.g., gas leak and/or gas plume). In other embodiments, the onboard sensors 15 of the UAV 14 may detect the anomaly first. This may be because the UAV 14 is closer to the leak source at the time the leak occurs, and the concentration of gas above the threshold may reach the UAV 14 first. In yet other embodiments, both the fixed sensors 13 and onboard sensors 15 on the UAV 14 may detect the anomaly at the same time. This may occur if the UAV 14 is equidistant from the leak source as the fixed sensors 13. In some embodiments, it may be advantageous for the UAV 14 to avoid navigating along an inspection mission within a threshold distance of the fixed sensors 13. This may help to reduce duplicative data collection from the fixed sensors 13 and the onboard sensors 15 on the UAV 14. Accordingly, one or more computer models and/or AI on the UAV 14 may navigate the UAV 14 during an inspection mission to follow a route that increases coverage for sensor feedback from the sensors 11 (e.g., 13 and 15). As a result, performing routine inspection missions away from fixed sensors 13 may provide more efficient coverage and better leak detection capability in a shorter span of time.

Further, the anomaly may be detected using any one or more types of sensors 11 (e.g., 13 and 15), such as temperature sensors, pressure sensors, gas concentration sensors, images (e.g., RGB images, thermal images, OGI images, etc.), wind sensors, weather sensors, and humidity sensors. For instance, the anomaly may be detected using the temperature sensor or thermal imaging, before later being confirmed using gas concentration data. In another instance, thermal imaging may not detect an anomaly, but the gas sensor may detect an anomaly.

Further, at block 170, once the anomaly detection is complete, the process 158 may also estimate a location of the anomaly (e.g., leak source) based on the analysis and computer models/AI (e.g., an intelligent engine, machine learning). The process 158 may utilize the feedback from the fixed sensors 13, the onboard sensors 15 of the UAV, or both.

For example, the process 158 may utilize gas concentration data and wind data to determine where the leak source 300 may be in relation to the UAV 14. In some embodiments, the process 158 may utilize feedback acquired over the course of its auto walks to estimate the location of the leak source. Specifically, the feedback may indicate that the gas concentration increased as the UAV 14 approached a first location and decreased when it approached a second location. Alternatively, or in conjunction, the gas concentration may have increased when the wind blew a first direction, but may have decreased when the wind blew a second direction. Further, the process 158 may utilize information from operation maps and piping and instrumentation diagrams (P&ID) to estimate the location of the anomaly based on the feedback. In certain embodiment, the location of a particular fixed sensor 13 that sensed the gas leak may be used to help identify the location of the leak source.

At block 172, the process 158 may navigate the UAV 14 to the estimated location of the anomaly assisted by computer models/AI. For example, one or more computer models and/or AI may be used to generate a navigation route to the estimated location based on various information (e.g., historical data, real-time data, etc.) regarding obstacles, hazards, etc. Once the navigation route is set, the UAV 14 may start moving along the navigation route while continuing to monitor sensor feedback from the various sensors 11 (e.g., 13 and 15). The process 158 may navigate the UAV 14 to the anomaly (e.g., leak source) using the feedback from the fixed sensors 13, the onboard sensors 15 of the UAV, or both, being acquired and processed in real-time. For example, as the UAV 14 moves along the navigation route, the sensor feedback may indicate trends that either confirm or contradict the original estimated location of the anomaly. For example, if the sensor feedback from the sensors 15 on the UAV 14 indicates an increasing gas concentration, then the UAV 14 may continue along the navigation route. However, if the sensor feedback from sensors 15 on the UAV 14 indicates a decreasing gas concentration, then the UAV 14 may return to block 170 to estimate the location of the anomaly and/or alter the navigation route. In other words, one or more computer models and/or AI may be used during movement of the UAV 14 toward the estimated location of the anomaly and intelligently change the navigation route based on the sensor feedback to ensure a correct and timely arrival at the anomaly. The one or more computer models and/or AI may be used during movement of the UAV 14 to analyze other information and/or events impacting the navigation route, including unexpected obstacles.

The process 158 may also base the navigation route to the anomaly (e.g., leak source) on the location of the UAV 14 when the process 158 estimates the leak location, the operation map, and P&ID information. The computer models/AI may utilize historical auto walk information to navigate the UAV 14 to the estimated location of the anomaly (e.g., leak source). For example, if an auto walk from earlier in the day indicated an obstacle likely to still be present, the computer models/AI may inform the UAV 14 to navigate a path to the estimated location that avoids the obstacle. In some embodiments, the process 158 may assume the obstacle is no longer present after a preset amount of time (e.g., 3 days, a week, etc.). In other embodiments, the process 158 may send an alert to the user to determine if the obstacle is still there and allow the user to clear the obstacle from the computer models/AI.

The computer models/AI may also utilize data input by the users when navigating the UAV 14 to the estimated leak source. User input data may include construction, shutdowns, emergencies, other leaks, and permanent or temporary changes to the operation map and/or P&ID data. The computer models/AI may base the navigation of the UAV 14 to the estimated source leak on the user input data.

Further, the computer models/AI may utilize past leak source navigation data to navigate the UAV 14 to the current leak source. Past leak source navigation data may include previous leak locations, previous leak severity, previous navigation routes, previous transit time to the estimated source leak, previous navigation changes made along the navigation route, time of day of previous leak, and previous accuracy of leak detection. For example, if a similar piece of machinery previously had a leak, and the system successfully navigated the UAV 14 to the leak source without issue, the computer models/AI may take a similar approach in this instance. Conversely, if previous navigation attempts to similarly located leak sources have been slow, unsuccessful, or required multiple adjustments along the navigation route, the computer models/AI may account for these errors and attempt to preemptively avoid similar flaws in its current navigation route. Additionally, in certain embodiments, the one or more computer models and/or AI may continuously improve via machine learning by evaluating decisions made in real-time during navigation to the estimated location, rewarding good or correct decisions during navigation to the estimated location, and penalizing for bad or incorrect decisions during navigation to the estimated location.

In certain embodiments, the navigation of the UAV 14 to the estimated location (block 172) may be initiated while the UAV 14 is docked at the docking station 16 and/or on an inspection mission away from the docking station 16. For example, the process 158 may detect the anomaly before the inspection mission by the UAV 14, and then automatically initiate the inspection mission by the UAV 14 to investigate the anomaly based on the navigation route. By further example, the process 158 may detect the anomaly in real-time during the inspection mission by the UAV 14, and then automatically cancel and/or alter the inspection mission by the UAV 14 to investigate the anomaly based on the navigation route.

At block 174, the process 158 may validate the location of the anomaly. This may occur based on continuous feedback from the fixed sensors 13 or the onboard sensors 15 of the UAV 14, or a combination thereof. For example, if the gas concentration levels increase as the UAV 14 gets closer to the estimated leak source, the process 158 may validate the navigation route. If the UAV 14 arrives at the estimated source leak and the gas concentration is higher than measured by the sensors 15 along the navigation route, then the process 158 may proceed to validate the location of the anomaly.

In some embodiments, the process 158 may also validate the location of the anomaly using onboard cameras, gas sensors, thermal sensors, and/or pressure or throughput information through the equipment with the leak. For example, the process 158 may validate the location of the anomaly by obtaining an image (e.g., thermal image, RGB image, and/or OGI image) of the equipment at the estimated location, and validate the location of the anomaly by detecting a gas plume in the image and/or detecting an originating point of the gas leak (e.g., leak source) at the equipment. By further example, the process 158 may validate the location of the anomaly by identifying a crack, a broken part, a gap between flanges, or other damage on the equipment, such as by using image analysis of the equipment. By further example, the process 158 may include an additional navigation of the UAV 14 at the estimated location to obtain additional sensor feedback, such as by obtaining sensor feedback while circling the estimated location, circling each piece of equipment at the location, or any combination thereof. In other embodiments, the process 158 may send a user to personally validate the location of the leak source.

At block 176, the process 158 may obtain additional feedback from onboard sensors 15 of the UAV 14 at the location of the anomaly independent and/or concurrent with feedback acquired for the location validation (block 174). This feedback may include feedback from gas sensors, temperature sensors, pressure sensors, wind sensors, acoustic sensors, vibration sensors, flame sensors, light sensors, and cameras (e.g., RGB cameras, thermal cameras, and OGI cameras). The UAV 14 may remain in the vicinity of the leak source and obtain feedback for a predetermined amount of time, or the amount of time sufficient to obtain all the feedback necessary to assess the leak.

At block 178, the process 158 may quantify the anomaly based on comparison with thresholds, historical data, and computer models/AI. The process 158 may quantify the anomaly based on factors, such as leak flow rate, leak volume, hazardousness of leak (e.g., toxicity, flammability, etc.), wind speed and direction, severity of equipment malfunction (e.g., hole size, corrosion, ill-fitting pipe, etc.). The system may use the quantification of the anomaly for future leak detections and computer model/AI training.

At block 180, the process 158 may perform actions based on the anomaly. These actions may include outputting a notification and/or report, executing an inspection via sensors and/or cameras, scheduling an inspection and/or service by a technician, generating a safe route for the technician to reach the location of the anomaly, executing a root cause analysis of the anomaly, adjusting one or more operating parameters of the facility based on the anomaly, or a combination thereof.

At block 182, the process 158 may output a notification and/or a report. The notification may be an alert sent to a GUI on an electronic display of a computing device. In some embodiments, the alert may inform the user there is a leak and where the leak is located, but provide no further details. This may be advantageous to encourage further inspection by the user. In some embodiments, the report may provide detailed feedback from the sensors and/or cameras, such as location, gas concentration data, gas identification data, pictures, and/or hazardous material warnings. For example, the alert may send the user a photo of the leak location and information about the gas identification and concentration. In some embodiments, the report may include a map of the facility 10, the location of the anomaly on the map, detailed information about the anomaly, and control options for a user to select. This may be advantageous by informing the user of the severity of the leak and encouraging immediate attention if necessary.

At block 184, the process 158 may execute an inspection via sensors and/or cameras, which may be independent and/or concurrent with the additional feedback of block 176. This inspection may include feedback from gas sensors, temperature sensors, pressure sensors, wind sensors, acoustic sensors, vibration sensors, flame sensors, light sensors, and cameras (e.g., RGB cameras, thermal cameras, and OGI cameras). The UAV 14 may remain in the vicinity of the leak source and obtain feedback for a predetermined amount of time, or the amount of time required to obtain all the feedback necessary to assess the leak. In certain embodiments, the inspection of block 184 may be performed by the same UAV 14 used in navigating to the anomaly and/or a separate UAV 14 having the same or different capabilities.

For example, the UAV 14 used in navigating to the anomaly may be a ground based UAV 14, whereas the separate UAV 14 may be an aerial drone capable of acquiring sensor feedback at various heights above the anomaly.

In some embodiments, the sensors may take continuous measurements of the leak until the system acquires a comprehensive understanding (e.g., enough information to communicate necessary features of the leak to a user) of the leak. The cameras may also take pictures of the leak location to help users visualize the leak. This may be advantageous if there is a hole, corrosion, or other visual indicator of the leak.

At block 186, the process 158 may schedule an inspection and/or a service by a technician. In some embodiments, the process 158 may automatically schedule an inspection or service by a technician at a time depending on an urgency of the anomaly. If multiple anomalies are detected and validated at the facility 10, then the one or more computer models and/or AI may intelligently prioritize the anomalies for additional inspection and repair. This may be advantageous to ensure that every leak is inspected and addressed by a human.

In certain embodiments, the process 158 may only schedule an inspection and/or service by a technician if parameters of the leak (e.g., gas concentration, flow rate, hazard levels, hole size, etc.). are above certain thresholds. For example, if the process 158 determines the gas concentration levels are below a threshold, it may send a notification to the user, but not schedule an inspection and/or service by a technician. This may be advantageous by allowing the user to prioritize other potential problems before the leak at issue when the leak's parameters indicate service or inspection may be postponed.

In some embodiments, the technician may be a user. The process 158 may determine the leak should be inspected or serviced by a technician. Using computer models/AI, the system may determine what specialty the technician may be for the particular leak. For example, if the process 158 determines the leak source is a valve, it may schedule a service or inspection with a user specializing in valves. Conversely, if the leak is of a hazardous material, the system may schedule an inspection or service with a user specializing in hazardous leaks. This may be advantageous by alerting the most relevant user first to be efficient.

In certain embodiments, the technician may be a robot designed to do further inspection of the leak, or make basic repairs (temporary or permanent). For example, if the leak is a hazardous leak, it may be safer for a robot to conduct an investigation of the leak over a human.

At block 188, the process 158 may generate a safe route for the technician to reach the location of the anomaly. The process 158 may utilize previously acquired data and a 3D map of the facility 10 to determine the route, while avoiding existing obstacles and hazardous areas, to improve safety for the technician. The process 158 may utilize operation maps, P&ID information, the technician's location in relation to the validated leak source, and information relating to any gas clouds. This may factor in the wind speed, wind direction, humidity, and gas concentration data collected on the navigation route to the anomaly. For example, the process 158 may generate a route that avoids areas known to have or predicted to have certain gas concentration levels that may be hazardous to the technician.

At block 190, the process 158 may execute a root cause analysis of the anomaly. The process 158 may base the root cause analysis on real-time and historical feedback from the sensors 11 (e.g., 13 and 15), real-time and historical data of equipment in the facility 10, and one or more computer models and AI. The real-time and historical data of equipment may include temperature, pressure, flow rate, speed, vibration, or any combination thereof, associated with operating the equipment. The real-time and historical data of equipment may include maintenance data (e.g., historical and scheduled), time of operation (e.g., hours, weeks, months, and/or years), relationships between equipment (e.g., valves, pumps, or compressors controlling flows to equipment), or any combination thereof. The one or more models may include 3D models and digital twins of the individual equipment and the facility 10, thereby enabling simulations of operation of the individual equipment and the facility 10. Thus, the one or more models and AI may enable a root cause analysis of the anomaly based on the various real-time and historical data. The process 158 may utilize factors such as leak history, the type of gas leaking, the leak source location, the operation map, P&ID information, the flow rate of the leak, scheduled maintenance, and image data of the leak (e.g., hole size, corrosion present, misplaced/displaced equipment, etc.). For example, if the rate of the leak is high, and cameras detected a displaced pipe, the computer models/AI may determine the leak was caused by a displaced pipe.

Conversely, if there is scheduled maintenance occurring in the leak source location, and the current leak data aligns with previous leak data occurring during similar maintenance, the computer models/AI may determine the root cause of the leak is the maintenance work.

At block 192, the process 158 may adjust one or more operating parameters of the facility based on the anomaly. The adjustment may include slowing or stopping a flow rate of one or more components involved in the section of the operation where the leak occurred. In some embodiments, the process 158 may adjust the parameters automatically. For example, if the process 158 determines the leak is hazardous, the process 158 may close a valve upstream to stop the leak. This may be advantageous to stop the leak at a faster rate than if a user must initiate the adjustment. In certain embodiments, the UAV 14, a controller of the equipment, and/or a controller of the facility 10 may be used to adjust the operating parameters, such as to reduce or eliminate the anomaly (e.g., leak), isolate the anomaly, and/or protect the equipment from damage.

In some embodiments, the process 158 may indicate to the user that an adjustment should be made. For example, the process 158 may send a notification to a graphical user interface (GUI) where the user may see the details of the leak and the system may recommend an action (e.g., slow flow rates, shut a valve, stop operation, etc.) for the user to perform. This may be advantageous by notifying users of the leak so the user may know about each leak and make a choice regarding the leak based on information the computer may not have access to (e.g., operating goals, availability to fix the leak, alternative flow paths, etc.).

Figure 4:
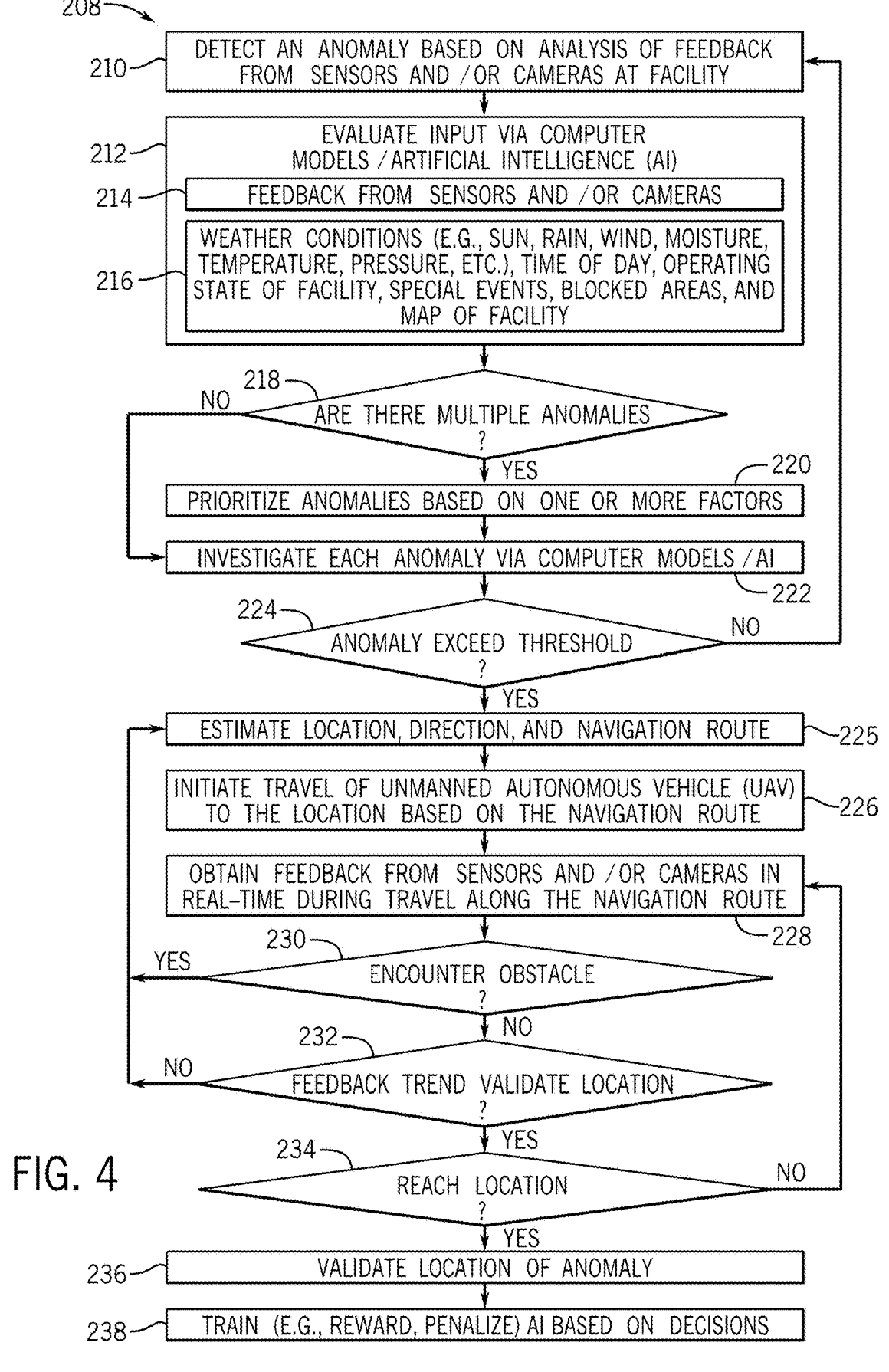
FIG. 4 is a flowchart of an embodiment of a process for navigating the UAV to an anomaly, illustrating various navigation decisions assisted by the computer models/AI.

FIG. 4 is a flowchart of an embodiment of a process 208 for navigating the UAV 14 to an anomaly. At block 210, the process 208 detects an anomaly based on analysis of feedback from sensors 11 (e.g., 13 and 15) at the facility 10. The anomaly detection may be based on the process 158 of FIG. 3, such as blocks 162, 164, 166, and 168 of the process 158. The sensors 11 (e.g., 13 and 15) may include any of the sensors described in detail above. Additionally, the UAV 14 may use one or more computer models and/or AI to improve the efficiency of navigating and monitoring the facility 10, wherein the one or more computer models and/or AI may be disposed on the UAV 14 and/or other computing devices (e.g., 16, 18, 20, 22, and/or 24).

At block 212, the process 208 may evaluate input via computer models/AI. For example, in block 214, the process 208 may utilize input such as feedback from sensors 11 (e.g., sensors and/or cameras), such as the fixed sensors 13 distributed throughout the facility 10 and the sensors 15 on the UAV 14. Further, at block 216, the process 208 may utilize input such as weather conditions (e.g., sun, rain, wind, moisture, temperature, pressure, etc.), time of day, operating state of the facility 10, special events, blocked (e.g., obstructed) areas, and a map of the facility 10. Together, the input from blocks 214 and 216 may be used in the subsequent analysis of multiple anomalies, navigation, and training of the computer models/AI. For example, in rainy weather, some areas of the facility 10 may be prone to flooding, while other areas may provide protection/cover from the rain. By further example, in sunny weather and/or certain times of the day, some areas of the facility 10 may experience glare from the sun that can affect the sensors 15 (e.g., sensors and/or cameras) on the UAV 14. By further examples, special events may involve people, vehicles, and/or equipment blocking certain areas of the facility 10. By further example, feedback from the sensors 11 (e.g., motion sensors, cameras, etc.) may sense activities in certain areas of the facility 10.

At block 218, the process 208 may determine if there are multiple anomalies. If multiple anomalies are detected at block 218, then the process 208 at block 220 may prioritize the anomalies based on one or more factors. In some embodiments, factors may include anomaly size, a level of hazardousness of anomaly, a level of importance of operation affected by the anomaly, a cost of materials involved in anomaly. For example, a gas leak with a higher concentration, volume, or flow rate may be prioritized higher than a corresponding lower concentration, volume, or flow rate. By further example, a leak in a chemical reactor may be prioritized higher than a leak in a conduit or equipment carrying steam, exhaust gas, or non-toxic gas. By further example, a leak involving a toxic gas may be prioritized higher than a leak involving a nontoxic gas. In certain embodiments, each factor may be given a weighting factor based on its importance or criticality, such that each leak may be assigned a score if multiple factors are associated with that particular leak. Thus, the process 208 may rank the anomalies based on their scores, and then prioritize the anomalies for investigation based on the ranked priorities. In certain embodiments, the process 208 may continuously monitor feedback from the sensors 11 (e.g., 13 and 15) in real-time (e.g., including during various investigations by the UAV 14) and alter the rankings and priorities if new sensor feedback and/or user input indicates that priorities should be changed for the investigations by the UAV 14. Additionally, the process 208 may consider the locations of the anomalies when navigating to the anomalies, and potentially investigate anomalies out of order if an anomaly is on a same navigation route as a higher priority anomaly. In general, however, once the process 208 prioritizes the anomalies at block 220, the process 208 then proceeds to investigate each anomaly based on the prioritization (e.g., a priority list of anomalies) or a sole anomaly if only one anomaly exists (block 222). The investigation of each anomaly is performed by the UAV 14 using the sensors 11 (e.g., 13 and 15) and computer models/AI.

At block 224, the process 208 will determine if the anomaly exceeds a threshold. In certain embodiments, the threshold may include a toxicity threshold, a gas concentration threshold, a gas flow rate threshold, a gas volume threshold, a thermal threshold, or any combination thereof, of a gas leak. In certain embodiments, the threshold may include an acoustic threshold, a visible light threshold, a flame intensity threshold, a vibration threshold, or any combination thereof. The thresholds may be based on industry standards or based on the unique needs of the operation. If the anomaly does not exceed a threshold, then the process 208 may evaluate a next anomaly in an order of priority if multiple anomalies exist or the process 208 may continue monitoring for anomalies until one is detected at block 210. Again, for each anomaly, the process 208 evaluates whether the anomaly exceeds a threshold as set forth in block 224.

If, at block 224, the anomaly exceeds the threshold, the process 208 may estimate the location of the anomaly, the direction of the anomaly relative to the UAV 14, and a navigation route for the UAV 14 to follow to arrive at the anomaly as set forth in block 225. The one or more computer models and AI may evaluate a variety of sensor feedback and parameters to obtain the estimations. For example, if fixed sensors 13 sense the anomaly, then the location of the fixed sensors 13 may be used to help triangulate the location of the anomaly. If the anomaly is a gas leak, then a wind direction combined with sensor measurements from the sensors 11 (e.g., 13 and 15) may be used to determine a direction of the anomaly relative to each sensor 11. In particular, if the wind is blowing leaked gas in a south direction, then the anomaly may be north relative to the sensor 11. If a gas concentration is higher by one sensor 11 and lower by another sensor 11, then the anomaly may be closer to the sensor 11 reading a higher gas concentration. Each of the foregoing sensor readings may be used by the computer models and AI to help triangulate the location and direction of the anomaly. Additionally, if the computer models and AI narrow down an area of the anomaly, then a map and/or 3D model of the facility may be used to locate equipment susceptible to the detected anomaly (e.g., gas leak). For example, the computer models and AI may identify an equipment that may leak a gas type, wherein the facility includes a plurality of equipment that may potentially leak a plurality of different gas types. The gas types may include a variety of acid gases (e.g., hydrogen sulfide ($H_2S$)), combustible gases (e.g., natural gas, methane, etc.), carbon dioxide ($CO_2$), refrigerants, inert gases (e.g., nitrogen), or any combination thereof. Thus, the type of detected gas may be used to help locate the equipment mostly likely to be leaking that detected gas. Based on the foregoing analysis, the process 208 may generate a navigation route to the estimated location of the anomaly taking into consideration any obstacles.

In some embodiments, the navigation route may create the navigation route from scratch. The navigation route may account for known boundaries or routes, factoring in operation maps, P&ID, and known construction. Further, the process 208 may utilize recent data acquired by other detected leaks or auto walks when creating the navigation route. For example, if the shortest route to the leak would have the UAV 14 pass through an area the UAV 14 determined on an earlier auto walk to be impassable, then the process 208 may generate a different navigation route to avoid the area known to be impassable. This may be advantageous to prevent the UAV 14 from having to alter its route during its route. In some embodiments, the navigation route may be the shortest known route to the leak from the current location of the UAV 14. The process 208 may utilize the operation maps, P&IDs, auto walk routes, the estimated location of the leak source, and the current location of the UAV 14. This may be advantageous to helping the UAV 14 arrive at the leak faster when there is no obstacle.

At block 226, the process 208 may initiate travel of the UAV 14 to the location based on the navigation route. At block 228, the process 208 may obtain feedback from sensors 11 (e.g., 13 and/or 15) in real-time during travel along the navigation route. The sensor feedback obtained from the sensors 11 (e.g., 13 and/or 15) may assist the computer models and AI in determining if the UAV 14 encounters an obstacle, if the sensor feedback trends in a way that validates the estimated anomaly location, and if the UAV 14 has reached the anomaly location. For example, the process 208 may determine the UAV 14 has the incorrect estimated leak source location if the data from the sensors 11 (e.g., 13 and/or 15) trends in a direction indicative that the leak may be in a different location. Accordingly, the process 208 may use the computer models and AI to continuously analyze the sensor feedback in real-time during movement of the UAV 14 along the navigation route, correct any errors in the estimated location of the anomaly, correct the navigation route based on the corrected location, and continue moving along the corrected navigation route. In certain embodiments, the UAV 14 may use satellite-based navigation system (e.g., Global Positioning System (GPS)), a local navigation system, or a combination thereof, to help navigate to the estimated location of the anomaly. In certain embodiments, the UAV 14 may use GPS navigation as a primary navigation system, while other location navigation systems are used as a secondary navigation and/or to navigate around obstacles. For example, a local positioning system may include an inertial navigation system, magnetometers, a visual positioning system (VPS) using a comparison of camera images to a pre-mapped database of the facility, a light detection and ranging (LiDAR) system, one or more proximity sensors, or any combination thereof.

At block 230, the process 208 may determine if the UAV 14 encountered an obstacle. Obstacles may include construction, rocks, debris, holes, fires, buildings, people, inclines the UAV 14 is incapable of traversing, equipment, other vehicles (e.g. trucks, golf carts, UAVs), stairs, and anything else the UAV 14 is incapable of traversing. If the process 208 determine the UAV 14 has encountered an obstacle, then the process 208 may direct itself back to block 224 to reassess the location of the anomaly, the location of the UAV 14, the direction of the anomaly from the UAV 14 and a navigation route for the UAV 14 to follow to arrive at the anomaly that avoids the obstacle the UAV 14 encountered. In some embodiments, the process 208 may use the one or more computer models and AI to assess the obstacle and attempt to navigate around the obstacle using a location navigation system.

If, at block 230, the process 208 does not determine that the UAV 14 has encountered an obstacle, the process 208 may then determine if the feedback trend from the sensors 11 (e.g., 13 and/or 15) validates the estimated anomaly location determined at block 224. If, at block 232, the process 208 determines the feedback trend does not validate the location of the anomaly (e.g., the sensors are detecting less gas, the cameras no longer see a plume, etc.), the process 208 may return to block 224 to estimate a corrected location using the feedback trends based on the sensors 11 (e.g., 13 and/or 15). If, at block 232, the process 208 validates the location of the anomaly using the feedback from the sensors 11 (e.g., 13 and/or 15), then the UAV 14 may continue its travel along the navigation route.

At block 234, the process 208 may determine if the UAV 14 has reached the anomaly location. In some embodiments the process 208 may determine the UAV 14 has reached the anomaly location by visualizing the leak source with onboard cameras. This may be advantageous when the leak source is visible. In some embodiments, it may be advantageous to use onboard sensors 15 to validate the anomaly location. The sensors 15 may validate the anomaly by determining that the data indicates the UAV 14 is farther from the anomaly when it moves further from the estimated leak source location in any direction. This method of validation may be advantageous when the leak source is not clearly visible. If the feedback does not indicate that the UAV 14 has reached the anomaly, then the process 208 may continue to loop through blocks 228, 230, 232, and 234 accordingly until the process determines the UAV 14 has reached the location of the anomaly.

Once the process 208 believes the UAV 14 has reached the location of the anomaly at block 236, then the process 208 may validate the location of the anomaly. In some embodiments, the process 208 may utilize computer/AI methods to validate the anomaly. For example, the sensors 15 on the UAV 14 may analyze the data at the leak source location and in the immediate surrounding area. If the data indicates the UAV 14 moves farther from the leak when it moves farther from the estimated leak source, then the location may be validated. Further, if the sensors 15 (e.g., sensors and/or cameras) can visualize or detect the exact leak location (e.g., the hole in a pipe, the leaking valve, etc.), then the process 208 may validate the location. In some embodiments, the process 208 may validate the leak location by requesting a user or technician visit the estimated leak source location to personally inspect and validate the location. This request may be sent via a notification on a GUI to the user device.

During and/or after validation of the location, at block 238, the process 208 trains (e.g., rewards, penalizes) the AI based on the analysis and decisions made in the process of finding the anomaly. In certain embodiment, the one or more computer models/AI may include machine learning and associated training associated with the prioritization of anomalies and the navigation route to each anomaly. For example, the process 208 may provide rewards to the AI when correct decisions are made and penalties to the AI when incorrect decisions are made associated with the navigation route, including correct or incorrect decisions regarding the prioritization of the anomalies, the estimated location of each anomaly, avoiding or traversing around obstacles, validating the estimated location based on feedback trends, and validating the location on-site upon reaching the estimated location. For example, if the UAV 14 was successful in locating the leak source location, then the computer models/AI may analyze decisions made along the navigation route and determine if the decisions were helpful or unhelpful to the navigation and location process. For example, if the UAV 14 detected an obstacle, rerouted itself around the obstacle, and was blocked by another obstacle, then the process 208 may train the computer models/AI on where the detected obstacles were located on a map of the facility, if the method of rerouting around the obstacles was effective, and "remember" the effective route. This may be advantageous to continuously improve the efficiency of the system by training it to avoid making similar, inefficient mistakes repeatedly.

Figure 5:
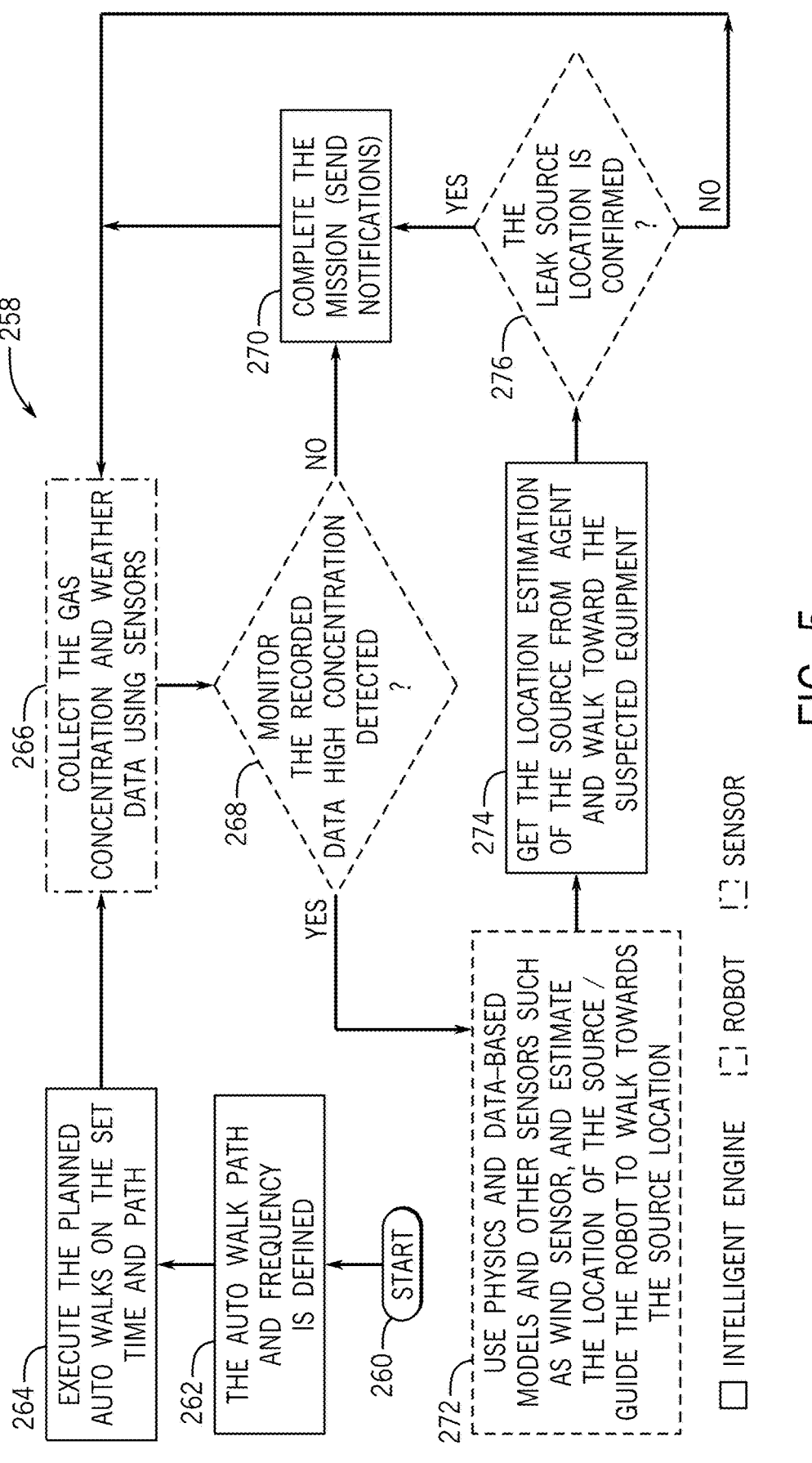
FIG. 5 is a flowchart of an embodiment of a process for navigating the UAV to an anomaly, illustrating a UAV inspection mission using navigation assisted by the computer models/AI.

FIG. 5 is a flowchart an embodiment of a process 258 for navigating the UAV 14 from a start 260 (e.g., docking station 16) to an anomaly. The process 258 may be used alone or in combination with various aspects of FIGS. 3 and 4. The workflow may include one or more of the following steps.

At block 262, the process 258 defines the auto walk path(s) and execution time(s) or frequency. It is suggested that the UAV 14 (e.g., robot) walks downwind of the potential leak sources. The downwind can be identified by the dominant wind history direction. Possible leak sources can be identified from experience. However, this recommendation does not limit the capability of the workflows, systems, and methods described herein (in other words, the workflows, systems, and methods) can still be used for scanning the whole facility 10.

Next, at block 264, the process 258 executes the planned auto walks by the UAV 14 (e.g., robot) on the auto walk path and time, as set at block 262. In some embodiments, the user may plan the auto walk routes based on the user's needs. In other embodiments, the process 258 may determine the auto walk route based on the location of the fixed sensors 13 and/or assets 12, feedback from the fixed sensors 13 and/or assets 12, the operation maps, and the past history of anomalies detected onsite. One or more computer models and AI also may select a route from a plurality of predefined navigation routes and/or generate a custom navigation route for the UAV 14 to inspect the facility 10, specific assets 12, and/or potential anomalies.

While executing the planned auto walks at block 264, the sensors 11 (e.g., 13 and/or 15) may collect the gas concentration and weather data at block 266. Sensors 11 (e.g., 13 and/or 15) may include any of the sensors described in detail above, including, for example, a gas sensor, an anemometer, a humidity sensor, a thermometer, a pressure sensor, an accelerometer, a magnetometer, and a global positioning system (GPS).

At block 268, the process 258 may use the computer models/AI to monitor the recorded data from the sensors 11 (e.g., 13 and/or 15). The measurements may be stored and analyzed locally on the UAV 14 and/or remotely on one or more computing devices (e.g., 16, 18, 20, 22, and/or 24). For example, the measurements may be transferred to an edge (or cloud) engine, which includes an intelligent agent (e.g., computer models/AI) that performs an analysis on the measurements. The edge (or cloud) engine may monitor the recorded concentrations. If no high concentration is detected, then the process 258 may determine there is no anomaly and progress to block 270, such that the UAV 14 (e.g., robot) may complete the mission and send notifications to the user.

At block 272, if a high concentration is detected at block 268, then the process 258 may use the computer models/AI (e.g., physics and data-based models) and other sensors 11 (e.g., 13 and/or 15), such as wind sensor, and estimate the location of the leak source. The process 258 may further use the computer models/AI to generate a navigation route to guide the UAV 14 (e.g., robot) to walk, roll, drive, or otherwise move towards the location of the leak source (i.e., the higher concentration gradient that should naturally be the reverse direction of the dominant wind at the moment).

At block 274, the UAV 14 (e.g., robot) may receive the location estimation of the leak source and/or the navigation route from the intelligent agent (e.g., compute models/AI) and walk, roll, drive, or otherwise move towards the equipment suspected of being the location of the leak source. Once the UAV 14 (e.g., robot) gets close to the leak source, then the intelligent agent (e.g., computer models/AI) may use other information, such as physics-based models and data-based models, to define an intersecting plane to the leak and guide the UAV 14 (e.g., robot) to take measurements via the sensors 15. The process 258 may then use the measurement to estimate approximate a precise location of the leak.

The process 258 may then command the UAV 14 (e.g., robot) to move toward the precise location of the leak and monitor the concentrations to ensure correct estimations. The intelligent agent (e.g., computer models/AI) may send a report to the end user when the right equipment is identified (or even if the high concentration is identified but cannot find the source). In certain embodiments, the intelligent agent may further quantify the leak (e.g., volume, flow rate, and gas composition of the leak).

At block 276, the intelligent agent (e.g., computer models/ AI) may confirm the leak source location. For example, process 258 may analyze the sensor feedback at the leak source location and in the immediate surrounding area. If the sensor feedback indicates the UAV 14 moves farther from the leak when it moves farther from the estimated leak source, the location may be validated at block 276. Further, if the sensors 15 can visualize or detect the exact leak location (e.g., a hole or crack in a pipe, a leaking valve, etc.), then the process 258 may validate the location.

If the leak source is confirmed at block 276, then the process 258 may progress to block 270, such that the UAV 14 (e.g., robot) may complete the mission and send notifications to the user. If the leak source is not confirmed at block 276, then the process 258 may revert back to block 266 where the sensors may collect gas concentration and weather data before progressing back through the steps described above.

FIG. 6 shows a widely-used funnel-type plume known as the Gaussian plume model, which may be one output associated with a report generated by the systems and methods described above with reference to FIGS. 1-5. In this popular model, the plume will form concentric ellipses that progressively increase in volume as the distance from the source increases in the downwind direction. For example, the illustrated plume model may be part of an output or report produced by the process 158 of FIG. 3 in block 182. In one embodiment, the plume model may be a simulation based on the collected sensor data from the sensors 11 (e.g., 13 and/or 15), including sensor data acquired by the sensors 15 on the UAV 14 during a navigation route to an anomaly (e.g., leak source 300).

The illustrated simulation (e.g., plume model) may be created by analyzing various sensor feedback, such as the gas concentrations, air pressure, wind speed and direction, temperature, humidity, solar radiations, leak rate, properties of the leaked gas, and operation specific factors (e.g., nearby fan output, nearby flares, structures such as buildings at downwind, etc.). This may be advantageous by providing a method for the user to create potential future plume predictions to gauge the severity of the leak.

In the illustrated embodiment, the leak source 300 is the location of the leak that generates a gas plume. The gas plume may be described with reference to the y axis 302, the z axis (e.g., the vertical axis) 304, and the x-axis 306. The leak source 300 is disposed at an actual stack height, $H_s$ (e.g., vertical height) 314 along the z axis 304. The x axis 306 and the y axis 302 define a horizontal plane at a ground level below the leak source 300.

Wind 308 may blow the gas leak away from the leak source 300 in a direction along the x axis 306, y axis 302, or both. A plume centerline 310 also extends through the gas plume away from the leak source 300, as the gas plume expands or disperses in the direction of wind 308. At each point along the plume centerline 310 of the gas plume, the vertical distance from the ground to the plume centerline 310 is the effective stack height 312 (e.g., $H_e$). The effective stack height 312 may progressively change (e.g., increase and/or decrease) in the direction of wind 308 away from the leak source 300, such as illustrated by the variable effective stack height 312 at positions $X_1$, $X_2$, and $X_3$ along the x-axis 306. For example, the gas plume may rise due to the buoyancy of the gas plume (e.g., hotter, lighter gas) relative to the surrounding air (e.g., cooler, heavier air). The gas plume also may include a variable gas concentration profile 316 along the y-axis 302 and/or the z-axis 304 at each position along the plume centerline 310. The one or more computer models and AI described above with reference to FIGS. 1-5 may use the gas plume model of FIG. 6 in various analyses of sensor feedback, thereby helping to determine an estimated location of a leak source, evaluate a criticality of the leak source, generate a navigation route to the leak source, output reports to an electronic display for user evaluation, and control assets of the facility 10.

Figure 7:
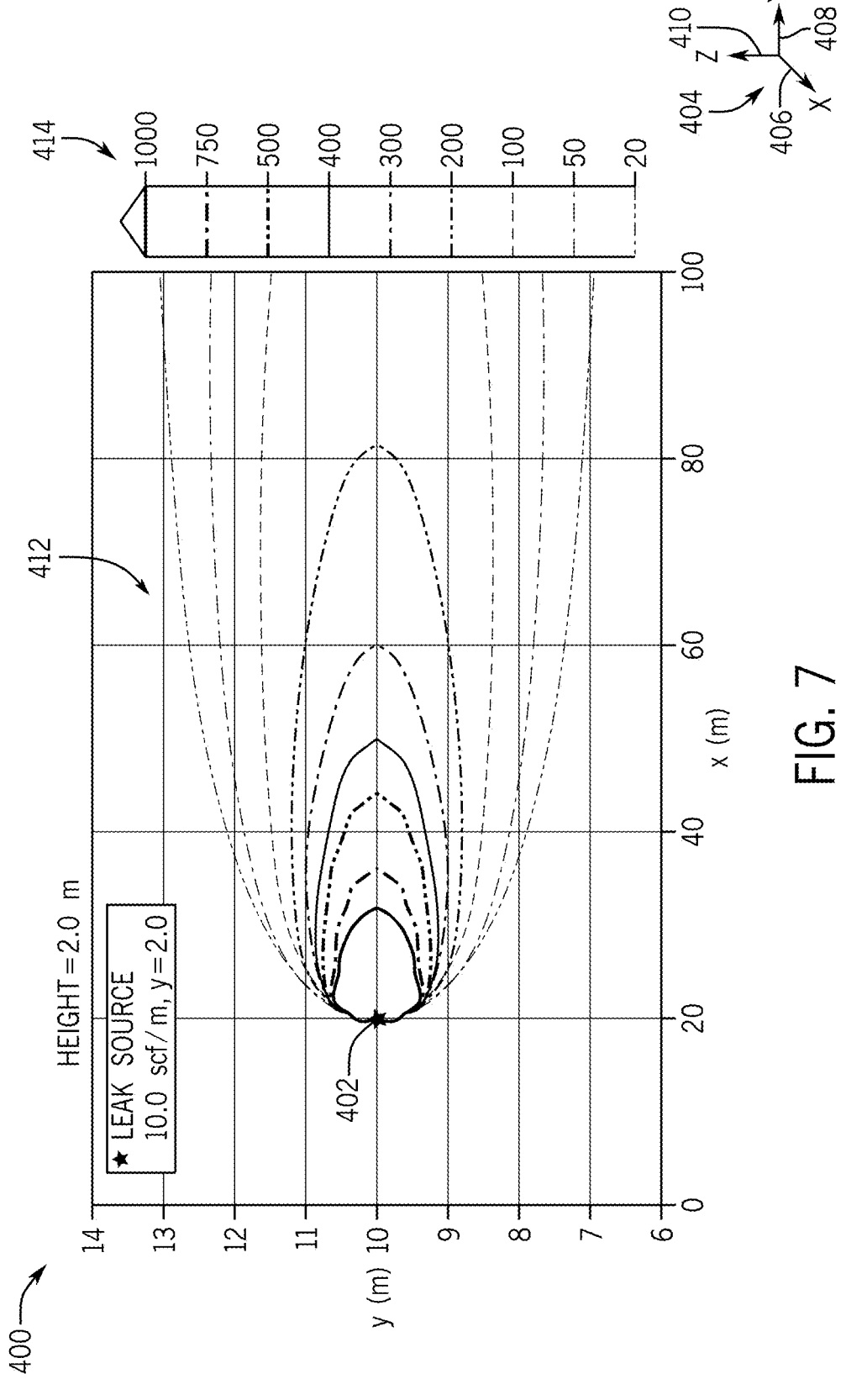
FIG. 7 is a schematic top view of a gas plume over time as wind affects its flow.

FIG. 7 is an example of an output or report having a contour plot 400 of a gas plume generated by the process 158 of FIG. 3 at block 182. For example, the contour plot 400 is in a first plane (X-Y) of a plume distribution from a single leak source 402. In the illustrated embodiment, the contour plot 400 may be described with reference to a coordinate system 404 having a first horizontal axis 406 (X-axis), a second horizontal axis 408 (Y-axis), and a vertical axis 410 (Z-axis). The illustrated contour plot 400 is shown in the first plane (X-Y) at a height of 2.0 meters along the vertical axis 410. The leak source 402 releases leaking gas at a flow rate of 10.0 SCP/M. Each contour line 412 may represent gas concentration variations (e.g., decreasing) with each contour line 412 further away from the leak source 402 in the first plane, wherein the concentration levels are shown in a legend 414. In the process 158 of FIG. 3, a report including this contour plot 400 may be sent to a graphical user interface (GUI) on an electronic display for user evaluation. In certain embodiments, the report may further include a variety of control options to control the facility 10 based on the report. Additionally, the report and associated data for the contour plot 400 may be stored on the UAV 14 and computing devices (e.g., 16, 18, 20, 22, and/or 24) for use as historical data and machine learning. Specifically, the output (e.g., report) data may be stored to later train the intelligent agent (e.g., computer models/AI) on predictability of gas plume spreading.

In some embodiments, the report may be used to train the intelligent agent (e.g., computer models/AI) on locating and navigating to future gas leaks. For example, the data in a report may be used to inform the intelligent agent (e.g., computer models/AI) how a gas leak spreads under different conditions, such as a type of gas, wind speed and direction, humidity, temperature, and air pressure. For example, a $H_2S$ leak in a humid, not windy environment may spread differently than a $H_2S$ leak in a dry, windy environment. The intelligent agent (e.g., computer models/AI) may utilize historical leak data and current sensor data to predict current leak plume size and shape. The intelligent agent (e.g., computer models/AI) may also utilize historical leak data and current sensor data to find the leak source. It may accomplish this by predicting the current size and shape of the gas plume and using that information to determine the leak source 402 based on the predicted plume and sensor readings to inform the intelligent agent (e.g., computer models/AI) a currently location of the UAV 14 relative to the leak source 402 of the gas plume.

Technical effects of the disclosed embodiments enable efficient monitoring of a facility using fixed sensors 13 and mobile sensors 15 associated with one or more UAVs 14, wherein one or more computer models and/or AI are used to intelligently navigate to an anomaly (e.g., leak source) in a facility. The computer models and/or AI may be stored and executed either locally on the UAV 14 or remotely on one or more computing devices (e.g., 16, 18, 20, 22, and/or 24). The computer models and/or AI may use various sensors feedback acquired in real-time, historical data, weather data, facility data, maps of the facility, and so forth to estimate a location of the anomaly, a direction from the UAV 14 toward the anomaly, and a navigation route from the UAV 14 to the anomaly for further inspection. During movement of the UAV 14 along the navigation route, the UAV 14 may acquire additional sensor feedback, correct the estimated location and/or navigation route, make decisions to traverse or avoid obstacles, learn from correct and incorrect navigation decisions via machine learning, and eventually reach and validate the location of the anomaly. The disclosed embodiments also may perform a variety of actions based on the detected anomaly, such as generating reports and enabling users to select control actions, controlling or adjusting various assets in the facility, and scheduling future inspections and maintenance.

The subject matter described in detail above may be defined by one or more clauses, as set forth below.

A method of operation of an unmanned autonomous vehicle, including autonomously maneuvering the unmanned autonomous vehicle about a facility, collecting gas concentration data using one or more sensors carried on or integrated with the unmanned autonomous vehicle, and monitoring the collected gas concentration data to detect a high concentration due to a gas leak. The method further includes, if a high concentration is detected, estimating a location of the gas leak and maneuvering the unmanned autonomous vehicle toward the estimated location of the gas leak.

The method of claim 1, wherein autonomously maneuvering the unmanned autonomous vehicle about the facility includes maneuvering the unmanned autonomous vehicle on pre-defined paths in the facility at pre-defined time intervals.

The method of claim 1, further including estimating a leak rate of the gas leak.

The method of claim 1, wherein an intelligent engine monitors the collected gas concentration data to detect the high concentration due to a gas leak and estimates the location of the gas leak.

The method of any preceding clause, wherein the intelligent engine is cloud-based.

The method of any preceding clause, further including generating a navigation route from a current location of the unmanned autonomous vehicle to the location of the gas leak.

The method of any preceding clause, further including changing the navigation route in response to one or more obstacles, sensor feedback, or a combination thereof, while maneuvering the unmanned autonomous vehicle toward the estimated location of the gas leak.

The method of any preceding clause, further including validating the location of the gas leak via sensor feedback using the one or more sensors after the unmanned autonomous vehicle reaches the location.

The method of any preceding clause, wherein estimating the location of the gas leak includes determining a direction from a current position of the unmanned autonomous vehicle toward the location of the gas leak based at least in part on a wind direction of wind.

The method of any preceding clause, wherein collecting gas concentration data further includes collecting gas concentration data using one or more fixed sensors in the facility.

A tangible and non-transitory machine readable medium having instructions to cause a processing system to autonomously maneuver an unmanned autonomous vehicle about a facility, collect gas concentration data using one or more sensors carried on or integrated with the unmanned autonomous vehicle, and monitor the collected gas concentration data to detect a high concentration due to a gas leak. If a high concentration is detected, the processing system is configured to estimate a location of the gas leak and maneuver the unmanned autonomous vehicle toward the estimated location of the gas leak.

The medium of the preceding clause, wherein the processing system is further configured to generate a navigation route from a current location of the unmanned autonomous vehicle to the location of the gas leak.

The method of any preceding clause, wherein the processing system is further configured to use one or more computer models and artificial intelligence to estimate the location and generate the navigation route.

The medium of any preceding clause, wherein the processing system is further configured to change the navigation route in response to one or more obstacles, sensor feedback, or a combination thereof, while maneuvering the unmanned autonomous vehicle toward the estimated location of the gas leak.

The medium of any preceding clause, wherein the processing system is further configured to determine a direction from a current position of the unmanned autonomous vehicle toward the location of the gas leak based at least in part on a wind direction of wind.

A system includes an unmanned autonomous vehicle having a motion system configured to autonomously maneuver the unmanned autonomous vehicle about a facility, one or more sensors configured to collect gas concentration data, and a control system configured to monitor the collected gas concentration data and detect a high concentration due to a gas leak. The control system is configured to estimate a location of the gas leak if a high concentration is detected, and maneuver the unmanned autonomous vehicle toward the estimated location of the gas leak.

The system of the preceding clause, wherein the control system is configured to generate a navigation route from a current location of the unmanned autonomous vehicle to the location of the gas leak.

The system of any preceding clause, wherein the control system is further configured to use one or more computer models and artificial intelligence to estimate the location and generate the navigation route.

The system of any preceding clause, wherein the one or more computer models and artificial intelligence are disposed on memory of the control system, one or more remote computing devices, or a combination thereof.

The system of any preceding clause, wherein the control system is further configured to determine a direction from a current position of the unmanned autonomous vehicle toward the location of the gas leak based at least in part on a wind direction of wind.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of operation of an unmanned autonomous vehicle, the method comprising:
  autonomously maneuvering the unmanned autonomous vehicle about a facility, wherein the unmanned autonomous vehicle comprises a ground vehicle;
  collecting gas concentration data using one or more sensors carried on or integrated with the unmanned autonomous vehicle;
  monitoring the collected gas concentration data to detect a concentration of gas above a threshold concentration due to a gas leak;
  estimating a location of the gas leak in response to the detected concentration being above the threshold concentration; and
  maneuvering the unmanned autonomous vehicle toward the estimated location of the gas leak, wherein artificial intelligence at least assists with maneuvering the unmanned autonomous vehicle toward the estimated location of the gas leak.

2. The method of claim 1, wherein autonomously maneuvering the unmanned autonomous vehicle about the facility comprises maneuvering the unmanned autonomous vehicle on pre-defined paths in boundaries of the facility at pre-defined time intervals.

3. The method of claim 1, further comprising estimating a leak rate of the gas leak.

4. The method of claim 1, further comprising generating a navigation route from a current location of the unmanned autonomous vehicle to the location of the gas leak.

5. The method of claim 4, further comprising changing the navigation route in response to one or more obstacles and sensor feedback, while maneuvering the unmanned autonomous vehicle toward the estimated location of the gas leak, wherein the artificial intelligence at least assists with changing the navigation route based on one or more factors including travel time, urgency, one or more risks, one or more hazards, or any combination thereof.

6. The method of claim 4, further comprising validating the location of the gas leak via sensor feedback using the one or more sensors after the unmanned autonomous vehicle reaches the location.

7. The method of claim 1, wherein estimating the location of the gas leak comprises determining a direction from a current position of the unmanned autonomous vehicle toward the location of the gas leak based at least in part on a wind direction of wind.

8. The method of claim 1, wherein collecting gas concentration data further comprises collecting gas concentration data using one or more fixed sensors in boundaries of the facility.

9. A tangible and non-transitory machine readable medium comprising instructions to cause a processing system to:

autonomously maneuver an unmanned autonomous vehicle about a facility, wherein the unmanned autonomous vehicle comprises a ground vehicle;
collect gas concentration data using one or more sensors carried on or integrated with the unmanned autonomous vehicle;
monitor the collected gas concentration data to detect a concentration of gas above a threshold concentration due to a gas leak;
estimate a location of the gas leak in response to the detected concentration being above the threshold concentration; and
maneuver the unmanned autonomous vehicle toward the estimated location of the gas leak, wherein artificial intelligence at least assists to maneuver the unmanned autonomous vehicle toward the estimated location of the gas leak.

10. The medium of claim 9, wherein the processing system is further configured to generate a navigation route from a current location of the unmanned autonomous vehicle to the location of the gas leak.

11. The medium of claim 10, wherein the processing system is further configured to use one or more computer models and the artificial intelligence to estimate the location and generate the navigation route.

12. The medium of claim 10, wherein the processing system is further configured to change the navigation route in response to one or more obstacles and sensor feedback, while maneuvering the unmanned autonomous vehicle toward the estimated location of the gas leak, wherein the artificial intelligence at least assists to change the navigation route based on one or more factors including travel time, urgency, one or more risks, one or more hazards, or any combination thereof.

13. The medium of claim 9, wherein the processing system is further configured to determine a direction from a current position of the unmanned autonomous vehicle toward the location of the gas leak based at least in part on a wind direction of wind.

14. A system, comprising:
  an unmanned autonomous vehicle, comprising:
    a motion system configured to autonomously maneuver the unmanned autonomous vehicle about a facility, wherein the unmanned autonomous vehicle comprises a ground vehicle;
    one or more sensors configured to collect gas concentration data; and
    a control system configured to monitor the collected gas concentration data and detect a concentration of gas above a threshold concentration due to a gas leak, wherein the control system is configured to estimate a location of the gas leak in response to the detected concentration being above the threshold concentration, and the control system is configured to maneuver the unmanned autonomous vehicle toward the estimated location of the gas leak, wherein artificial intelligence at least assists to maneuver the unmanned autonomous vehicle toward the estimated location of the gas leak.

15. The system of claim 14, wherein the control system is configured to generate a navigation route from a current location of the unmanned autonomous vehicle to the location of the gas leak.

16. The system of claim 15, wherein the control system is further configured to use one or more computer models and the artificial intelligence to estimate the location and generate the navigation route.

17. The system of claim 16, wherein the one or more computer models and the artificial intelligence are disposed on memory of the control system, one or more remote computing devices, or any combination thereof.

18. The system of claim 15, wherein the control system is further configured to determine a direction from a current position of the unmanned autonomous vehicle toward the location of the gas leak based at least in part on a wind direction of wind.

19. The method of claim 1, wherein the artificial intelligence at least assists with estimating the location of the gas leak and generating a ground navigation route based on historical data, user input, one or more obstacles, and sensor data.

20. The system of claim 14, wherein the system, in response to an anomaly, schedules an inspection by a technician, executes a root cause analysis of the anomaly, adjusts one or more operating parameters of the facility, or any combination thereof.

\* \* \* \* \*